(12) United States Patent
Ladner et al.

(10) Patent No.: US 6,331,825 B1
(45) Date of Patent: Dec. 18, 2001

(54) MOBILE LOCATOR SYSTEM

(75) Inventors: David L. Ladner, Minneapolis; Andrea J. Grazzini, Eagan; Ronald E. Konezny, Minneapolis, all of MN (US)

(73) Assignee: Peoplenet, Inc., Chaska, MN (US)

( * ) Notice: Subject to any disclaimer, the term of this patent is extended or adjusted under 35 U.S.C. 154(b) by 0 days.

(21) Appl. No.: 09/047,608

(22) Filed: Mar. 25, 1998

Related U.S. Application Data

(63) Continuation-in-part of application No. 08/783,292, filed on Jan. 10, 1997, now abandoned, which is a continuation of application No. 08/332,351, filed on Oct. 31, 1994, now Pat. No. 5,594,425.
(60) Provisional application No. 60/048,223, filed on May 30, 1997, and provisional application No. 60/052,879, filed on Jul. 17, 1997.

(51) Int. Cl.[7] ................................................. G08G 1/123
(52) U.S. Cl. .................. 340/988; 340/989; 340/990; 342/457; 701/207; 701/208
(58) Field of Search ......................... 340/825.49, 539, 340/573.1, 988, 573.4, 426, 989, 991, 990, 995; 342/457, 357; 701/207, 208, 213, 300

(56) References Cited

U.S. PATENT DOCUMENTS

| | | | |
|---|---|---|---|
| 3,714,650 | * 1/1973 | Fuller et al. | 343/15 |
| 4,057,794 | 11/1977 | Grossfield | 340/311 |
| 4,257,038 | * 3/1981 | Rounds et al. | 340/426 |
| 4,384,288 | 5/1983 | Walton | 340/825.34 |
| 4,651,157 | * 3/1987 | Gray et al. | 342/457 |
| 4,706,689 | 11/1987 | Man | 128/903 |
| 4,742,357 | 5/1988 | Rackley | 342/457 |
| 4,797,948 | 1/1989 | Milliorn et al. | 455/54 |
| 4,827,395 | 5/1989 | Anders et al. | 364/138 |
| 4,837,700 | 6/1989 | Ando et al. | 364/449 |
| 4,924,402 | 5/1990 | Ando et al. | 364/449 |
| 4,952,928 | 8/1990 | Carroll et al. | 340/825.54 |
| 4,998,095 | 3/1991 | Shields | 340/574 |
| 5,003,317 | 3/1991 | Gray et al. | 342/457 |
| 5,043,736 | 8/1991 | Darnell et al. | 342/357 |
| 5,119,102 | 6/1992 | Barnard | 342/357 |
| 5,142,281 | 8/1992 | Park | 340/991 |
| 5,155,689 | 10/1992 | Wortham | 364/460 |
| 5,208,756 | 5/1993 | Song | 364/449 |
| 5,218,367 | 6/1993 | Sheffer et al. | 342/457 |
| 5,218,716 | 6/1993 | Comroe et al. | 455/33.4 |
| 5,221,925 | 6/1993 | Cross | 340/988 |
| 5,223,844 | 6/1993 | Mansell et al. | 342/357 |
| 5,225,842 | 7/1993 | Brown et al. | 342/357 |

(List continued on next page.)

FOREIGN PATENT DOCUMENTS

| | | |
|---|---|---|
| 2 125 497 A | 3/1984 | (GB) . |
| 2 125 597 | 3/1984 | (GB) ........................ 340/825.45 |

OTHER PUBLICATIONS

"Peoplenet Communications Corp. Raises $1.5 Million in Equity Funding", Peoplenet Communications Corporation brochure, 1996.
"Five Major Components Form The Vehicle Based Locator and Communications System", Peoplenet Communications Corporation brochure, 1996.
"Intouch Tractor–Mounted Locating Device", Peoplenet Communications Corporation brochure, 1996.
"Intouch Trailer–Mounted Locating Device", Peoplenet Communications Corporation brochure, 1996.

(List continued on next page.)

*Primary Examiner*—Brent A. Swarthout
(74) *Attorney, Agent, or Firm*—Westman, Champlin & Kelly, PA

(57) ABSTRACT

A locator system comprises a locator device, a control center, a workstation and a computerized interface. The control center and the locator device are configured to communicate via cellular and pager signals.

24 Claims, 18 Drawing Sheets

U.S. PATENT DOCUMENTS

| | | | |
|---|---|---|---|
| 5,235,633 | | 8/1993 | Dennison et al. ...................... 379/60 |
| 5,299,132 | | 3/1994 | Wortham .............................. 364/460 |
| 5,311,197 | | 5/1994 | Sorden et al. ....................... 342/457 |
| 5,327,144 | | 7/1994 | Stilp et al. ............................ 342/387 |
| 5,355,511 | | 10/1994 | Hatano et al. ....................... 455/11.1 |
| 5,365,451 | | 11/1994 | Wang et al. .......................... 364/449 |
| 5,379,224 | | 1/1995 | Brown et al. ........................ 364/449 |
| 5,392,052 | | 2/1995 | Eberwine ............................. 342/357 |
| 5,398,190 | | 3/1995 | Wortham .............................. 364/460 |
| 5,418,537 | | 5/1995 | Bird ..................................... 342/357 |
| 5,422,816 | | 6/1995 | Sprague et al. ...................... 364/449 |
| 5,452,211 | | 9/1995 | Kyrtsos et al. ...................... 364/449 |
| 5,469,151 | * | 11/1995 | Lavelle et al. ....................... 340/426 |
| 5,525,969 | | 6/1996 | LaDue .................................. 340/573 |
| 5,594,425 | | 1/1997 | Ladner et al. .................. 340/825.06 |
| 5,594,740 | | 1/1997 | LaDue . |
| 5,610,821 | * | 3/1997 | Gazis et al. .......................... 340/990 |
| 5,771,455 | | 6/1998 | Kennedy, III et al. .............. 455/456 |
| 5,777,580 | * | 7/1998 | Janky et al. .......................... 342/457 |
| 5,796,634 | * | 8/1998 | Craport et al. ....................... 340/988 |
| 5,845,203 | | 12/1998 | LaDue .................................. 455/414 |
| 6,023,232 | * | 2/2000 | Eitzenberger ........................ 340/988 |
| 6,069,570 | * | 5/2000 | Herring ................................ 342/457 |
| 6,088,636 | * | 7/2000 | Chigumira et al. ................... 701/26 |

OTHER PUBLICATIONS

"Annual Report 1996", Peoplenet Communications Corporation brochure, 1996.

"Winland Electronics Receives a $5.5 Million Purchase Agreement", Peoplenet Communications Corporation brochure, 1996.

"Standard Overhead Installation", Peoplenet Communications Corporation brochure, 1996.

"Mobile communication solutions for cost–conscious trucking firms", Peoplenet Communications Corporation brochure, 1996.

"Tractor–Mounted Two–Way Messaging Display", Peoplenet Communications Corporation brochure, 1996.

"Mobile communication solutions for cost–conscious trucking firms", Peoplenet Communications brochure, 1996.

"Highway Master Features & Benefits", brochure, 1995.

"Suggested Pre–Programmed Driver to Dispatcher Message", Peoplenet Communications Corporation brochure, 1996.

"PeopleNet News Release", Peoplenet Communications Corporation brochure, 1996.

* cited by examiner

FIG. 17

TABLE 1
COMMAND LIST

CALL NOW (MID 1)
REQUEST ALARM REPORT (MID 2)
SEND ALARM LIST (MID 47)
ALARM SWITCH 1 ON (MID 3)
ALARM SWITCH 1 OFF (MID 4)
ALARM SWITCH 2 ON (MID 11)
ALARM SWITCH 2 OFF (MID 12)
ALARM SWITCH 3 ON (MID 43)
ALARM SWITCH 3 OFF (MID 44)
ALARM SWITCH 4 ON (MID 45)
ALARM SWITCH 4 OFF (MID 46)
BATTERY ALARM ON (MID 5)
BATTERY ALARM OFF (MID 6)
911 ALARM ON (MID 7)
911 ALARM OFF (MID 8)
MOVEMENT ALARM ON (MID 9)
MOVEMENT ALARM OFF (MID 10)
SET MODE (MID 13)
GPS (BREADCRUMB) INTERVAL (MID 14)
CALL IF LD IS INSIDE A CIRCLE (PAGER MID 1)
CALL IF LD IS OUTSIDE A CIRCLE (PAGER MID 2)
CHANGE VOICE HANDSET CALL ALLOTMENT (MID 15)
INCREMENT VOICE HANDSET CALL ALLOTMENT (MID 16)
EXTERNAL POWER DETACHED ALARM ON (MID 17)
EXTERNAL POWER DETACHED ALARM OFF (MID 18)
CHANGE NAM (AMPS) (MID 19)
CHANGE CALLING SEQUENCE (MID 20)
SID SPECIFIC SYSTEM SELECTION (MID 21)
SET SLEEP CYCLES (MID 22)
NV RAM PURGE (MID 23)
SET PAGER GROUPS (MID 24)
DISPLAY PREPROGRAMMED MESSAGE (MID 25)
DISPLAY FREEFORM MESSAGE (MID 26)
CHANGE SYSTEM SELECTION OPTIONS (MID 27)
CHANGE SYSTEM SELECTION OPTIONS (MID28)
SET PREPROGRAMMED MESSAGES (MID 29)
SEND NEW SCRIPT (MID 30)
ERASE ALL SCRIPTS (MID 30)
REQUEST AMPS CONFIGURATION (MID 32)
REQUEST SID LIST (MID 33)
REQUEST PAGER GROUP BITMASK (MID 34)
REQUEST PREPROGRAMMED MESSAGE LIST (MID 35)
REQUEST CALL RESTRICTIONS LIST (MID 36)

FIG. 18

TABLE 1
COMMAND LIST

COMMUNICATIONS TEST RESPONSE (MID 38)
REQUEST SCRIPT DUMP (MID 39)
SET PAGER CYCLES (MID 37)
CHANGE AMPS PIN BEHAVIOR (MID 40)
REQUEST ALL SCHEDULE STRINGS (MID 41)
REQUEST NV RAM AUDIT (MID 42)
CLEAR NV RAM AUDIT (MID 48)
SET 111 PHONE NUMBER (MID 49)
SET CELLULAR SLEEP POWER CYCLES (MID 50)
SET DIAGNOSTIC NUMBER BANK (MID 51)

FIG. 19

TABLE 2
LD TO CC MESSAGE LIST

MESSAGE CONFIRMATION (MID 64)
LOCATION BREADCRUMB (MID 65)
DRIVER PREPROGRAMMED MESSAGE (MID 66)
ALARM MESSAGE (MID 67)
ALARM STATUS (MID 68)
CALL RECORD (MID 69)
RETURN ALL PREPROGRAMMED MESSAGES (MID 70)
RETURN ALL SCHEDULED STRINGS (MID 71)
RETURN AMPS AND PAGER CONFIGURATION INFORMATION (MID 73)
RETURN SID LIST (MID 74)
RETURN PAGER GROUP BITMASK (MID 75)
RETURN CALL RESTRICTION LIST (MID 76)
PERFORM A COMMUNICATIONS TEST (MID 77)
RETURN CURRENT SCRIPTS (MID 78)
RETURN NV RAM AUDIT (MID 79)
RETURN ALARM CODE LIST (MID 80)
NOTIFICATION OF STATE CHANGE (MID 81)

MOBILE LOCATOR SYSTEM

REFERENCE TO CO-PENDING APPLICATION

The present invention is a continuation-in-part application of application Ser. No. 08/783,292, filed Jan. 10, 1997, now abandoned which is a continuation of a patent application having Ser. No. 08/332,351, filed Oct. 31, 1994, entitled Personal Area Locator, now U.S. Pat. No. 5,594,425; and provisional application Ser. No. 60/048,223, filed May 30, 1997, and provisional application Ser. No. 60/052,879.

BACKGROUND OF THE INVENTION

The present invention relates to mobile locator systems. More specifically, the present invention relates to a mobile locator system which employs pager and cellular communication, and provides user interface through a network such as the internet.

Various mobile locator systems are known. These systems have been used for a range of different applications. One such application, for example, is stolen vehicle recovery. In order to recover stolen vehicles, a mobile unit is placed in a hidden location in a vehicle and adapted to become active when a vehicle security system detects a theft.

Once engaged, the mobile unit begins acquiring location information typically by acquiring position signals from a global positioning satellite system. The mobile unit then communicates the information to a control center which maps the information and also attempts to notify the vehicle owner in order to verify that a theft has indeed occurred. Upon verification, the control center notifies the authorities and provides position information for the stolen vehicle.

Such conventional mobile locator systems include two components, a locator device and a command center.

The locator device usually comprises a position determination system, and a communication system coupled to the position determination system for communicating the position of the locator device as determined by the position determination system. The position determination system has taken various forms in the past. Known locators have employed various ground based navigational systems such as LORAN-C and other forms of LORAN navigation. Additionally, the position determination systems have more recently begun employing satellite navigation from the NAVSTAR system or GLONASS system or both.

The communication systems employed by locator devices have ranged from radio communication, such as UHF, to cellular communication.

The command centers used in mobile locator systems have traditionally communicated directly with the locator device via RF or cellular communication. Although cellular communication uses radio-frequency communication, it does so on very specific frequencies and through specific networks. Thus, it is listed separately to denote the different nature of cellular communication from traditional RF communication.

The approaches of the prior art are limited. First, traditional approaches are costly, and employ either cellular communication which is relatively expensive, or dedicated radio communications, which is also costly. Even where inexpensive radios are used to communicate the position information, the effective range of such inexpensive radios severely limits the location system. Finally, if users wish to interact with the control center, they generally must be onsite, or within the local calling area of the command center, lest they accumulate substantial long distance telephone charges.

SUMMARY OF THE INVENTION

A locator system comprises a locator device, a communication station, a control center, and a computerized interface. The communication station communicates with the locator device. The control center is coupled to the communication station through a network. The computerized interface resides at the control center, and the locator system provides bi-directional communication between the communication station and the locator device via the computerized interface and through the computer network.

BRIEF DESCRIPTION OF THE DRAWINGS

FIGS. 17–19 illustrate tables showing various command and message lists.

DETAILED DESCRIPTION OF THE PREFERRED EMBODIMENTS

Figure 1:
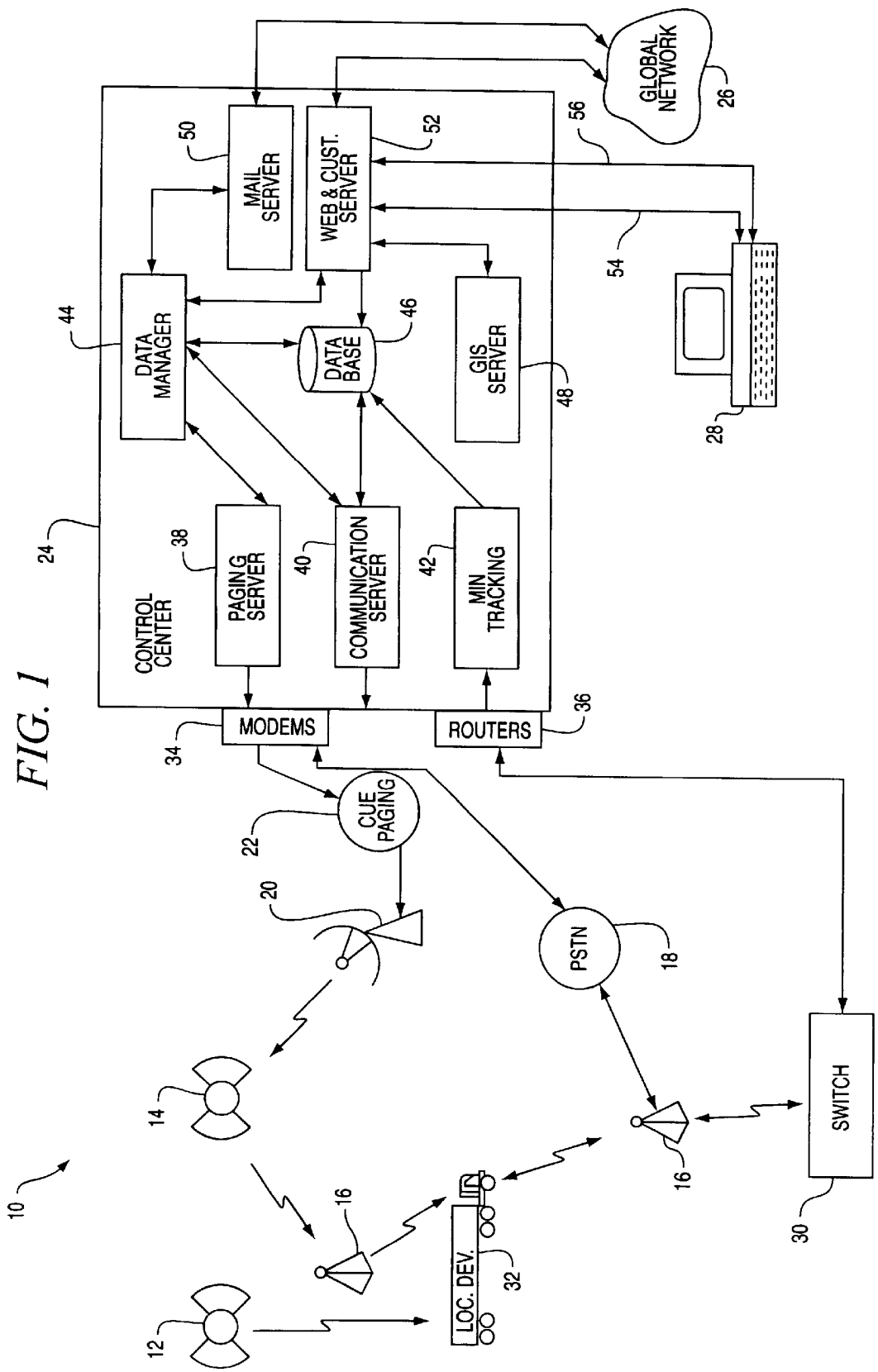
FIG. 1 is a block diagram of a locator system in accordance with the present invention.

FIG. 1 is a block diagram of a mobile locator communication system 10 in accordance with the present invention. FIG. 1 illustrates Global Positioning System (GPS) satellite 12 (which represents a satellite-based positioning system such as NAVSTAR or GLONASS), satellite communication system 14, cellular communication towers 16, public switched telephone network 18, satellite uplink station 20, cue paging network 22, control center 24, global network 26, customer station 28, and switch 30. FIG. 1 also illustrates locator device 32 which is installed in, for example, a semi tractor or trailer. It should be noted at the outset that while FIG. 1 illustrates GPS satellite 12, other suitable positioning systems could also be used such as LORAN.

In the embodiment shown in FIG. 1, locator device 32 is implemented as a fleet tracking device for tracking a fleet of semi tractors or trailers. In that embodiment, each of a plurality of locator devices 32 are installed in a semi tractor or trailer. Each of the locator devices receives GPS information from GPS satellite 12. Device 32 is adapted to determine its own position based upon signals received from GPS satellite 12. As described in greater detail with respect to FIG. 2, locator device 32 includes a cellular transceiver and modem, a control circuit which includes control electronics, a GPS receiver, a pager, and other suitable accessories, such as appropriate cabling and power connections, and antennae. Locator device 32 may also optionally include an operator interface, such as a message display, or an operator input device which receives inputs from an operator associated with locator device 32.

Control center 24 includes modems 34, router 36, paging server 38, communication server 40, MIN tracking circuit 42, data manager 44, data base 46, GIS server 48, mail server 50, and global network and customer interface server 52. Customer station 28 is preferably connected to control center 24 for bi-directional communication either through a dedicated pipe 54, through a direct telephone line 56, or through global network (such as the internet) 26. Customer workstation 28 may simply be a personal computer. The personal computer may optionally be required to have internet access, and an internet browser, or a modem.

Paging server 38 is connected to modems 34 and data manager 44. Communication server 40 is connected to modems 34, to data base 46 and data manager 44. MIN tracking circuit 42 is connected to router 36 and data base 46. Mail server 50 is connected, through global network 26, to station 28, and also to data manager 44. Web server 52 is coupled to data base 46 and data manager 44, and also to station 28. Further, GIS server 48 is coupled to data base 46 and web server 52.

When control center 24 tracks the location device 32, the location device 32, in a preferred embodiment, periodically receives location information from GPS satellite 12 and stores a location indicated by that information. Location device 32 also, in the preferred embodiment, periodically transmits that location information to control center 24 via a cellular data transmission through cellular network 16, PSTN 18, and modems 34. The information is received by communication server 40 and provided to data base 46, where it is stored for further processing. Any other information received from locator device 32 is also transferred by communication server 40 to data base 46 for further processing.

In order to view, or generate reports based on, the location information, a customer at station 28 accesses web server 52. Web server 52 receives the requested location information from data base 46. GIS server 46 receives the latitude and longitude signals and generates a textual description of the location, based upon those signals and provides that textual description to data base 46 where it is stored in a location associated with that particular locator device 32. In addition, GIS server 48 provides web server 52 with maps based on the position information requested by the customer at station 28. The maps are generated also in accordance with the location information which is being retrieved, and which is stored in data base 46. Thus, web server 52, as will be described with reference to later figures, provides a customer interface to the customer which includes a textual description of the location, along with the longitude and latitude coordinates, as well as maps of the requested location. The customer can request additional detailed location information, which is described later in the specification, by requesting web server 52 to access that information and present it in usable customer interface format to the customer.

In addition, the information periodically received by locator device 32 may include other items of data (which will be described in detail later in the description) such as alarm conditions, or a request by the operator of locator device 32 to send a message to a particular customer at a particular workstation 28. In that case (i.e., when the data received from locator device 32 requires some action on behalf of the control center) communication server 40 stores the data in data base 46, and provides an indication to data manager 44 that action needs to be taken. Data manager 44 places that request in a queue, based upon its priority, and then executes that transaction in due course.

For instance, where the operator of locator device 32 requests that a message be sent to a customer, communication server 40 receives the data indicative of the message, and stores that data in data base 46. Communication server 40 then provides data manager 44 with an indication that a message needs to be sent to a particular customer, and indicates to data manager 44 the location of that message in data base 46. Data manager 44 then, in due course, retrieves the message to be sent to the customer, and controls web server 52, or mail server 50 (as desired) to initiate communication with the customer at station 28, and to send the desired message.

In communicating with locator device 32, control center 24 can communicate, on its own behalf or on behalf of an administrator residing at control center 24, or on behalf of a customer residing at station 28. For example, if a customer wishes to send the operator of locator device 32 a message, that customer obtains access to web server 52, and requests web server 52 to receive the message and store it in data base 46. Web server 52 then indicates to data manager 44 that a message must be sent. Data manager 44 executes that transaction in due course by accessing the data indicative of the message, and the destination of the message, from data base 46, and then controlling communication server 40 or paging server 38 (whichever is desired) to initiate communication with locator device 32 through modems 34. Web server 52 typically receives from the customer at station 28 some indication as to whether the customer wishes to communicate with locator device 32 by a page or by a cellular communication. Web server 52 provides this information to data manager 44 (either directly or through data base 46) and data manager 44 contacts locator device 32 accordingly.

In one preferred embodiment, group communication with a plurality of locator devices 32 is accomplished through paging. This can be done in a highly efficient manner at very low cost. By contrast, where a specific voice or data communication is to go to only one locator device 32, and the customer wishes to initiate bi-directional communication, the cellular network may be better suited for that type of communication.

In another preferred embodiment, the message received from locator device 32 may request that control center 24 communicate with a customer at station 28 via e-mail. In that instance, communication server 40 receives the body of the message and stores that data in data base 46. Communication server 40 then notifies data manager 44 that an e-mail must be sent. Data manager 44 executes that transaction in due course, by retrieving the data from data base 46 and providing it to mail server 50 which causes an e-mail to be sent to station 28. The customer at station 28 may also communicate with locator devices 32 by e-mail, in the reverse order.

Additionally, communication system 10 preferably provides control center 24 with access to various cellular overhead signals via switch 30. Such signals are known in the art, and typically are required to ensure system synchronization. For example, cellular transceivers generally transmit registration signals to cellular communication systems in which they are operating. The purpose of such signals is generally to inform the cellular communication system that the cellular transceiver is within the range of the cellular communication system. However, because control center 24 has access to the overhead signals of the cellular communication system, control center 24 is able to know which mobile locator device 32 is within range of which particular cellular communication system, and determine a general location of locator device 32, at a very low cost.

As is also known in the art, cellular communication systems communicate with one another in a standardized manner generally called an SS7 signal employing an IS41 protocol. Typically, the registration signal transmitted by a cellular transceiver is received by a non-home cellular communication system, and such information is transmitted to the home cellular system through the SS7 signal. Thus, the combination of control center 24 having access to the cellular communication system, and the SS7 signal coupling the cellular communication system to various other cellular communication systems, allows control center 24 to approximate locations of all mobile locator devices 32 without incurring any significant cost.

This is done by router 36 receiving the overhead information from switch 30. Switch 30, in turn, receives the information from the cellular network to which it is coupled. Router 36 transmits the information to MIN tracking circuit 42 which decodes and deciphers the mobile identification number (MIN) and posts this to data base 46.

This leads to an additional benefit. MIN tracking circuit 42 is configured to monitor the proximity of the locator device 32 based on the overhead information received. If, in adjacent or closely proximate monitoring intervals, locator device 32 indicates that it is in two different and distant locations (cell sites); MIN tracking circuit 42 can interpret this as indicating that device 32 has been tampered with. For instance, it is impractical that a locator device could register with a cellular communication system in one location such as Oregon and 15 minutes later register with another very distant cellular communication system in Florida. Thus, in this instance, fraud detection and control is provided to some extent.

Additional fraud protection is also provided by MIN tracking 42. For example, MIN tracking circuit 42 is configured to monitor the usage profile of each locator device 32, and compare that to the profile which MIN tracking circuit 42 has seen before for that locator device 32. For example, if the user of locator device 32 is initiating a very large amount of cellular communications with locator device 32, and that is inconsistent with the prior usage profile for that particular locator device 32, MIN tracking circuit 42 flags this as a potential fraudulent usage. In addition, MIN tracking circuit 42 is configured to monitor calling patterns associated with each particular locator device 32. In that embodiment, MIN tracking circuit 42 monitors the time at which calls are normally made by the operator of locator device 32. If that calling pattern is abnormal, or inconsistent with a prior calling pattern (for example, if a large number of calls are being made at an odd hour of the day, and the operator of that particular locator device 32 typically makes calls only every eight hours, or so) MIN tracking circuit 42 also flags this as a potential fraudulent usage of that particular locator device 32.

The access of control center 24 to cellular communication system overhead also allows control center 24 to take action based upon low cost star code calls received by the cellular communication system from mobile locator device 32. Star codes, as is known in the art, are generally very low cost communications which are virtually universally recognized by all cellular communication systems and generally are passed through at very little charge. Often, a star code call is a type of phone call from a cellular transceiver to a cellular communication system itself to perform various functions. However, the access of control center 24 to cellular communication system overhead allows control center 24 to monitor star code calls emanating from mobile locator device 32 and to take specific action in response.

Thus the unique interaction between control center 24 and the cellular communication system allows proximity location of mobile locators devices at very low cost. Further, some limited fraud detection and control is provided. Finally, the ability of mobile locators to add data to or customize registration interaction with cellular communication systems, and utilize star codes, provides some limited low cost cellular massaging.

In operation, control center 24 can communicate with locator device 32 either through paging, or through cellular communication. This provides a great deal of functionality. Control center 24 essentially uses these lines of communication to gather data from location device 32, and to communicate with one or more of locator devices 32. The particular communication between locator device 32 and control center 24 can be for any number of reasons. For example, control center 24 may wish to simply receive position information from locator device 32 to update its data base and to track locator device 32. Control center 24 may also, however, wish to initiate a one-way or two-way voice or data communication with locator device 32, or an operator or user residing in the vicinity of a locator device 32. Further, control center 24 may initiate a communication with locator device 32 based upon a prompt or request from a customer at customer station 28. The combination of cellular communication, and paging communication, allows transactions required for tracking and generating reports related to a plurality of locator devices 32 to be performed in a highly efficient manner.

Figure 2:
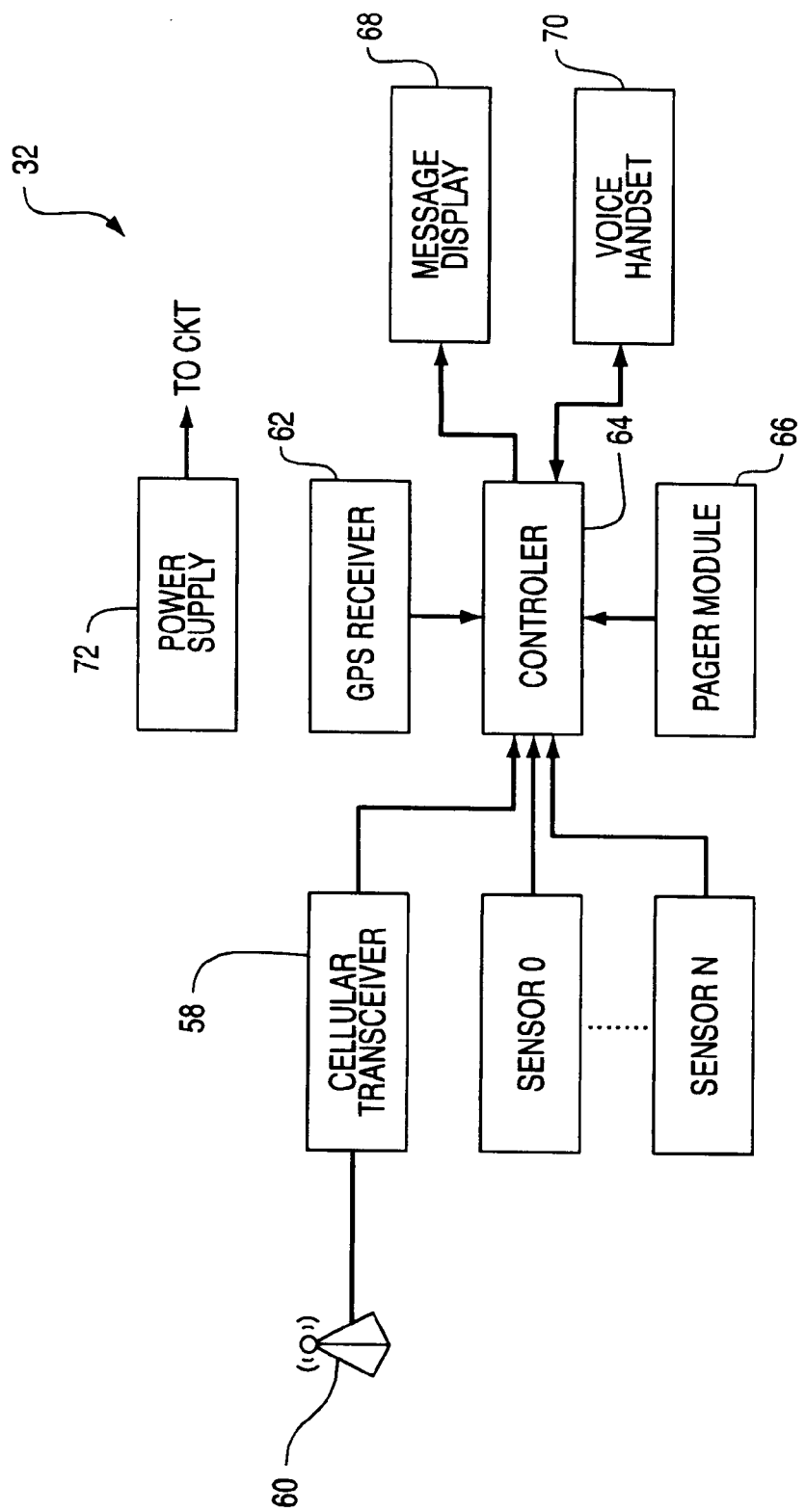
FIG. 2 is a more detailed block diagram of a locator device in accordance with the present invention.

FIG. 2 is a more detailed block diagram of locator device 32. In the preferred embodiment, locator device 32 preferably includes cellular transceiver 58 (which also preferably includes a cellular modem) and antennae 60. Locator device 32 also preferably includes a plurality of sensors 0–N, GPS receiver 62, controller 64, pager module 66, message display 68, and voice handset 70. Locator device 32 also includes either a power source, or a connector for connecting to a power source (collectively referred to as a power supply 72). It should also be noted that most of the items are optional, such as sensors 0–N, message display 68 and voice handset 70.

However, in one preferred embodiment, sensors 0–N are provided. Those sensors are placed on items to be sensed in the proximity of locator device 32. For example, sensors 0–N may be placed on a semi tractor or trailer to sense various aspects of the tractor or trailer and provide an output indicative of the sensed parameters to controller 64. In one preferred embodiment, a door sensor is provided on the trailer or passenger door of the truck and provides an indication to controller 64 as to whether the door is open or closed. In another preferred embodiment, a switch is placed on the dash board, or in another accessible location in the cab of the truck, which is usually accessible by the driver and which can be actuated to provide a panic alarm input to controller 64. Such a switch would be actuated by the driver during, for instance, a robbery.

Further, volume sensors can be placed in a trailer. Such sensors are preferably sonic-based sensors mounted on the ceiling of the trailer. The sensors provide an indication to controller 64 as to the load then being carried by the trailer. In other words, the array of sensors is arranged along the ceiling of the trailer, from front to back, and senses whether a load is being carried in a corresponding part of the trailer. The sensors provide outputs indicating how full the trailer is. These, and other sensors, can be implemented in locator device 32.

Controller 64 can perform any number of functions based on that information. For example, controller 64 may preferably simply store the trailer volume sensor information until control center 24 interrogates locator device 32. At that time, controller 64 operates locator device 32 to transmit the volume information such that control center 24 receives and maintains a record as to the volume of the load then being carried by that particular trailer. In addition, controller 64 can initiate communication with control center 24 based on the inputs from sensors 0–N. This can be accomplished in any desired hierarchy.

Locator device 32 also preferably includes pager module 66. Pager module 66 is configured to receive pager information transmitted by control center 24. Pager module 66 demodulates and provides data signals indicative of the pager information to controller 64. As with the other various inputs, controller 64 can be configured to perform any desired function based on the information received.

GPS receiver 62 is configured, with an appropriate antenna, to receive the GPS information from GPS satellite 12. GPS receiver 62 receives this information and transmits information signals to controller 64 indicative of the GPS signals received. Controller 64 preferably stores this information in an associated memory (either integral with controller 64, or separate therefrom) and provides the information to control center 24 upon request.

Message display 68 and voice handset 70 are preferably provided for communication with the operator of the locator device 72. In other words, if locator device 72 is to be used other than simply to track the location of an object, but is instead used to also accomplish interactive communication or one-way communication with the operator, message display 68 and voice handset 70 are provided. In the preferred embodiment, message display 68 is simply a liquid crystal display (LCD) (or other suitable display) which is capable of displaying messages to the operator. Message display 68 may also be associated with an input mechanism, such as push buttons or scroll buttons, by which the operator of locator device 32 can acknowledge receipt of the displayed messages, or can initiate limited one-way communication with control center 24.

In other words, in one preferred embodiment, message display 68 is provided with scroll buttons and send buttons. In that instance, the operator of locator device 32, after receiving a message on message display 68, can scroll through a number of preprogrammed messages and send one of those messages in response to the received message. In an alternative embodiment, a keypad or keyboard (or membrane-type keypad or other suitable input device) is provided along with message display 68. In that embodiment, the operator of locator device 32 can compose free form messages and send those back to control center 24.

Voice handset 70 is preferably a typical voice handset which is configured to receive voice transmission from the operator of locator device 70 and transmit information signals to controller 64 indicative of the voice input received. Voice handset 70 is also suitable for receiving information signals from controller 64 which are indicative of voice signals received by cellular transceiver 58, and providing an audible voice output based on the signals received. In this way, two-way voice communication can be accomplished between locator device 32 and control center 24 via the cellular network and the PSTN network.

Power supply 72 can take any number of forms. For example, power supply 72 may include a solar panel, batteries, a battery charger (which can be tethered to the engine of the semi trailer in which locator device 32 is mounted) or can simply be a connection device for connecting locator device 32 to a power supply on board the truck in which locator device 32 is mounted. Any other suitable configurations can also be implemented as power supply 72.

As described above, web server 52 is used to interface with customers at customer station 28. The customer interface actually resides on web server 52. Therefore, in order to access control center 24, or communicate with any of its locator devices 32, the customer must proceed through server 52.

Figure 3:
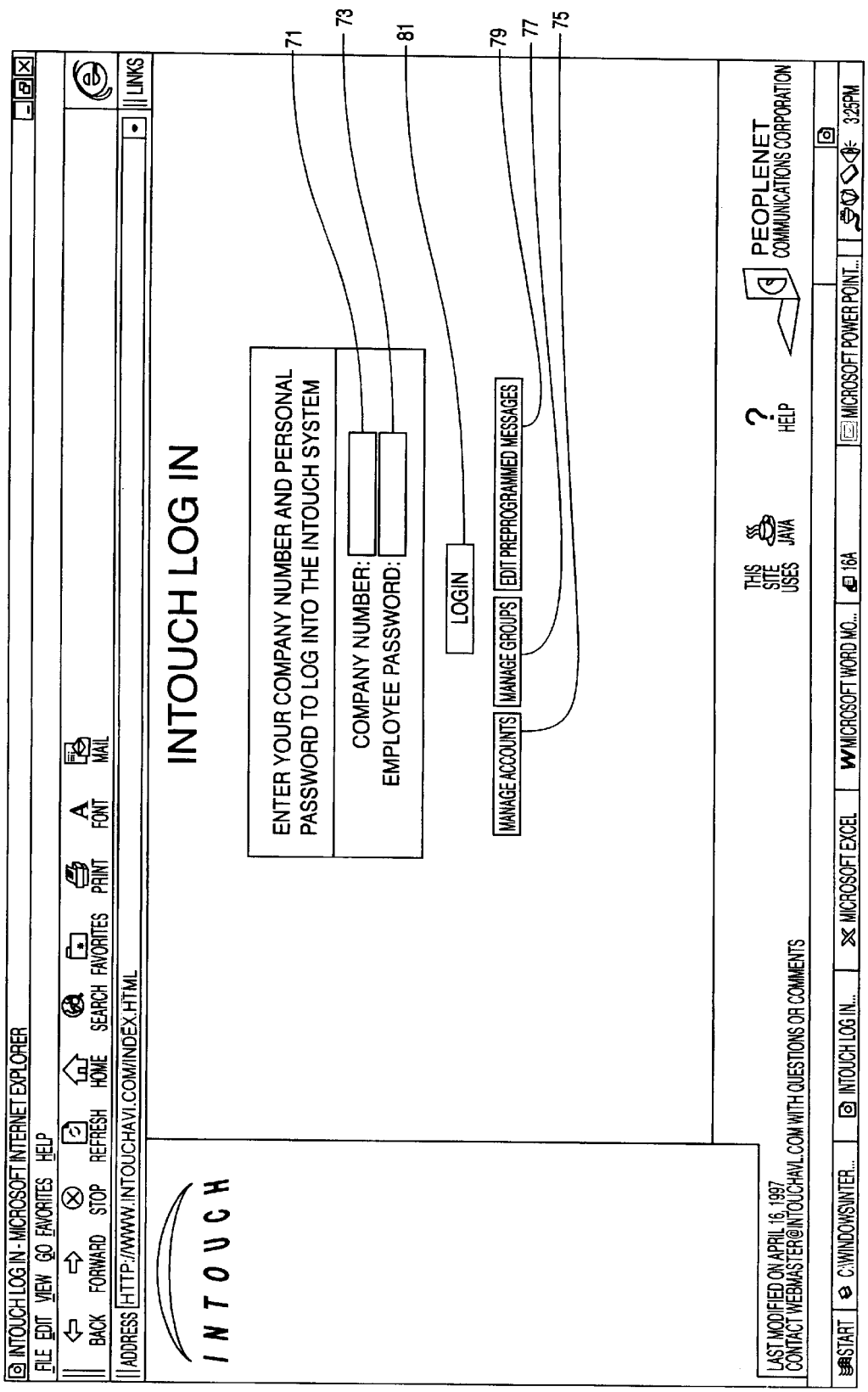
FIGS. 3–16 illustrate embodiments of a computer user inter ace in accordance with the present invention.

In the preferred embodiment, once accessed by a customer, server 52 provides a log-in screen, such as that illustrated in FIG. 3.

The customer interface in FIG. 3 as used in the internet connection embodiment of the present invention is created by interactions between web server 52 and internet access software such as Netscape®. For example, upon gaining access to control center 24 for the first time, web server 52 provides the internet access software with a series of commands preferably in hyper-text markup language (HTML) and, JAVA, or other appropriate programming language to create the interface. Likewise, user interaction with the user interfaces is preferably provided to web server 52 in the form of appropriate commands, preferably HTML.

The customer interface illustrated in FIG. 3 requests that the customer enter certain information, such as a company number (in field 71) associated with a customer, and an employee password (in field 73) which maintains some degree of security in accessing control center 24. After the customer has logged in via customer station 28, server 52 assigns a session number to that communication, and then tracks and logs information and items which are transacted during that session. This information is written to data base 46 (in FIG. 1) and is correlated to that particular customer's company number. Information which is used in creating a session number includes the time that the session was initiated, the particular customer initiating the session, and the items accomplished during the session.

Upon entering the appropriate company number and employee password, the customer is given a number of options including a manage accounts option (by clicking on bar 75), a manage groups option (by clicking on bar 77), an edit preprogrammed messages option (by clicking on bar 79), and a log-in option (by clicking on bar 81). These options are discussed, in order, below.

Figure 4:
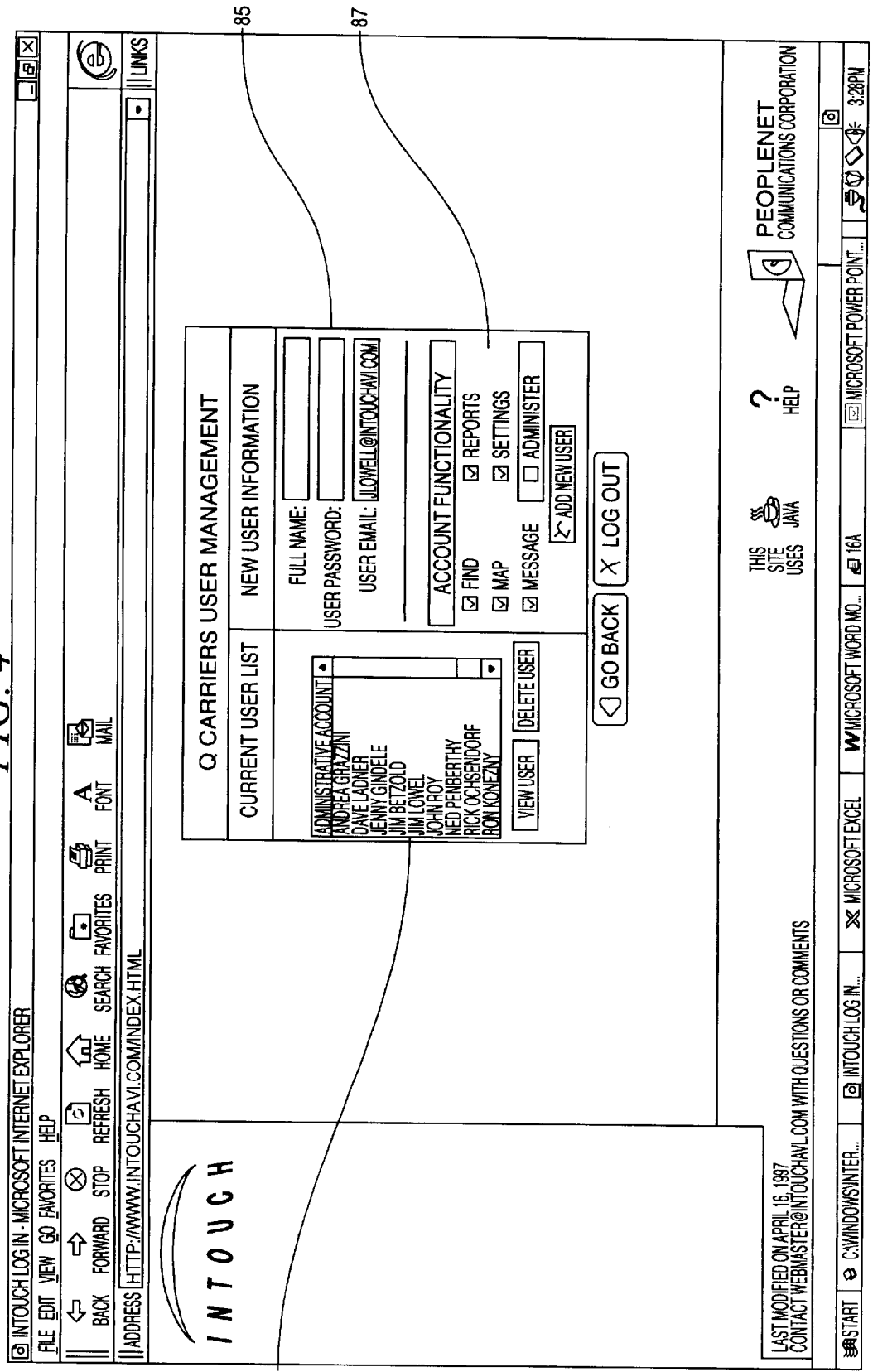

Once the user is validly logged in, and if the user selects the manage account option in FIG. 3, by clicking on bar 75, the user is presented with a second user interface screen, such as that illustrated in FIG. 4. The user is then allowed to either view and scroll through the current user list (displayed in field 83) which lists users authorized to use the system, or to delete those users. In the preferred embodiment, the ability is also provided for the customer to add new users. In that case, information is entered in the new user information box 85, such as the name and user password of the new user, as well as the new user's e-mail address. Also, the operator is allowed to assign certain functionality which can be executed by the new user by selecting and deselecting certain functions in box 87. For example, the find and mapping functions allow the user to locate various of its locator devices 32, and to view maps associated with the location. The message function allows the user to send and receive messages to the various locator devices 32, and the reports and settings functions allow the user to generate and view reports, and to change various settings in its particular customer configuration.

Figure 5:
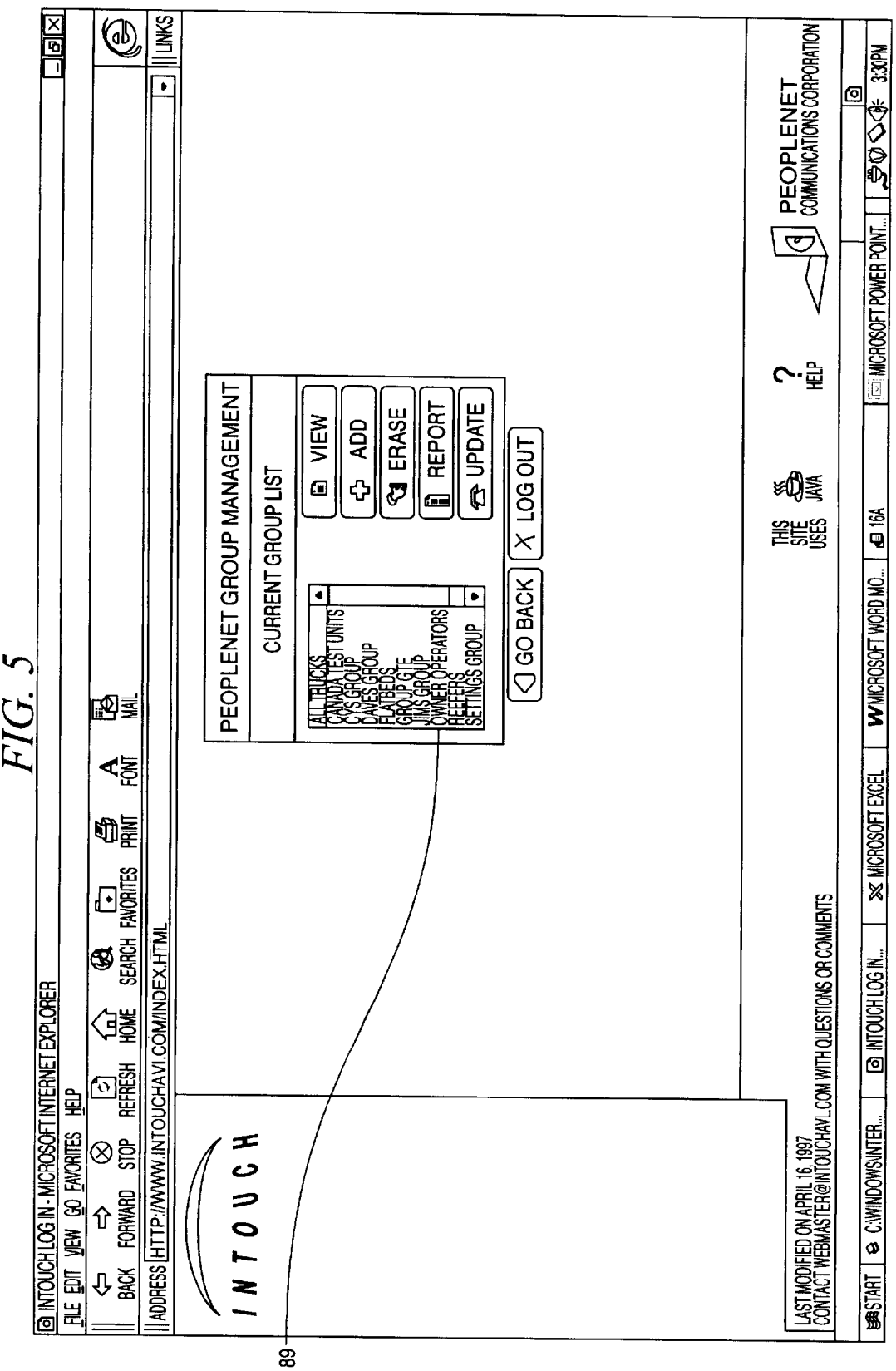

If, in FIG. 3, the user chooses the manage groups option by clicking on bar 77, the user is presented with another user interface, such as that illustrated in FIG. 5. One preferred feature for enhancing the efficiency of the system is the ability to arrange the various locator devices 32 associated with any given customer, into groups, or to at least provide the customer with that option. Therefore, the user interface illustrated in FIG. 5 allows the user to arrange its particular locator devices 32 into groups. The user is allowed to view the current groups in field 89, add groups, erase groups, generate reports associated with each of the groups, and update the groups and various information associated with the groups, simply by clicking on the appropriate portions of the user interface screen. The configuration and use of groups is discussed in greater detail below.

Figure 6:
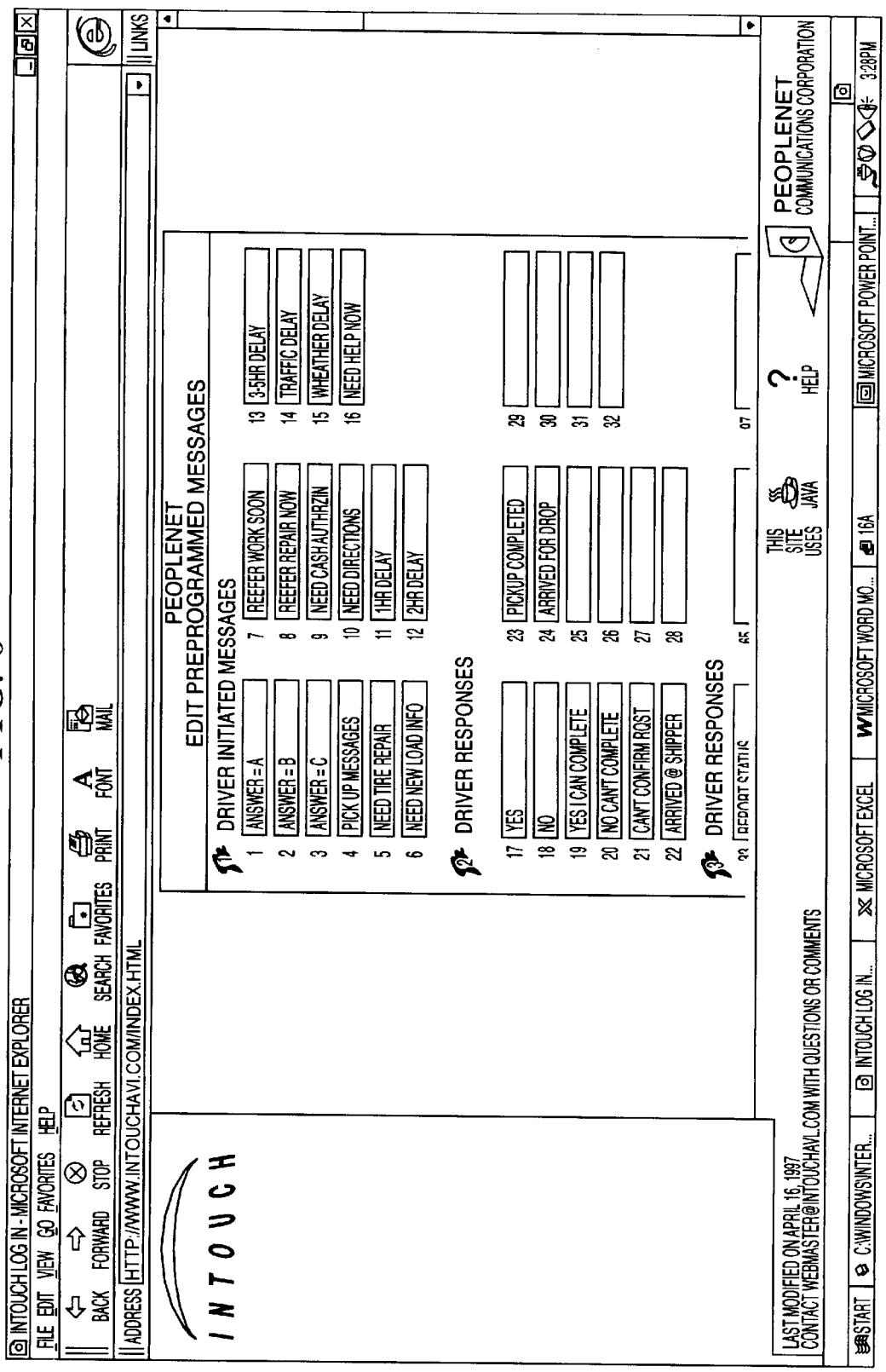

If, in FIG. 3, the user selects the edit preprogrammed messages option by clicking on bar 79, the user is provided with yet another user interface screen, such as that illustrated by FIG. 6. To simplify communication between any particular user or dispatcher at station 28, and drivers or operators associated with locator devices 32, a number of preprogrammed message capabilities are provided. For instance, preprogrammed messages can be provided for driver initiated messages, driver responses, or messages from the dispatcher to the driver. In the instance in which preprogrammed messages are used, the dispatcher may simply select a preprogrammed message to be sent (as will be described later with respect to FIG. 7) and server 52 posts transaction data to data base 46 and indicates to data manager 44 that a transaction needs to be executed. At an appropriate time, data manager 44 accesses the transaction data stored in data base 46. That transaction data preferably includes the desired locator devices which need to be accessed, and the message data to be sent to those particular locator devices, along with a chosen path for sending the data (i.e., pager or cellular communication). Data manager 44 then accesses the necessary paging or communication server 38 or 40 to accomplish the communication.

The driver then receives the message on the message display 68 (shown in FIG. 2) associated with the particular locator device 32. The driver then preferably has the option, as described with respect to FIG. 2, to scroll through the preprogrammed messages (either the driver initiated messages or driver responses shown in FIG. 6) and send one of those messages back to the dispatcher through control center 24. In any case, FIG. 6 provides the dispatcher with the capability of adding to, subtracting from, or editing the preprogrammed messages available to the driver and to the dispatcher.

Once appropriate log-in information is received on the interface illustrated by FIG. 3, and if no further log-in options are requested, the operator can click on log-in bar 81 to continue interaction with control center 24. Server 52 provides the dispatcher or user at station 28 with the ability to access information associated with its particular locator devices 32. In doing so, server 52 generates yet another customer interface, such as that illustrated by FIG. 7.

Figure 7:
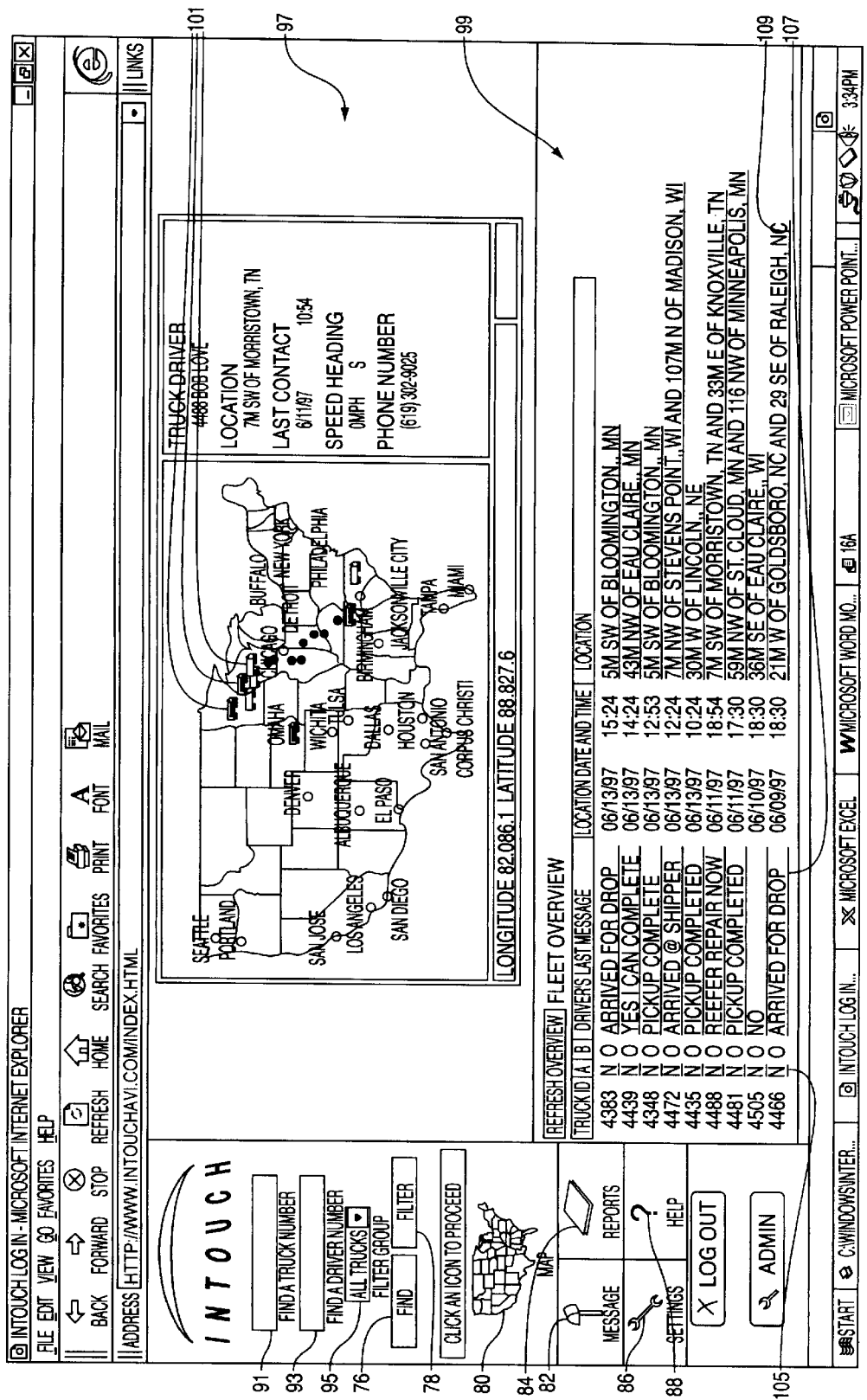

FIG. 7 shows that the first customer interface to be presented by server 52 is one which shows a fleet overview. The fleet overview illustrates all locator devices (in this instance semi tractor or trailer trucks) 101 on a nationwide map 103 illustrated in an upper portion 97 of the interface screen. On the upper left hand corner of the interface illustrated in FIG. 7, the dispatcher is provided with the ability to find a specific locator device 32, by either entering a number in field 91 or a driver name for that truck in field 93. If that information is entered, the particular truck number, driver name, location (by approximate address), last contact date and time, current speed, and current cellular telephone number, is illustrated for the particular driver on the right hand side of map 103. Also, in the fleet overview interface, the last messages received by the members of the fleet are displayed below the map 103 in a data field 99, along with the date and time of the message, the location from which the message was transmitted and the alarm configuration, and alarm status, of each truck.

FIG. 7 also illustrates that the dispatcher is provided with the option to find or filter through various groups of locator devices 32 using group field 95 and bars 76 and 78. In other words, the operator can select among a number of the groups defined in FIG. 5, and can have only that group displayed on the map 103.

As briefly discussed above, a highly configurable feature of the present invention is the ability to create groups and subgroups of mobile locators. Thus a user has the ability to create functional subgroups within the total group of mobile locators for which the user has access. With respect to fleet management systems, one such appropriate subgroup may be delivery trucks while another appropriate subgroup would be over-the-road transports. As another example, a mobile locator system embodied in a vulnerable persons management system can have different subgroups comprising children and elderly persons.

The grouping technique is implemented with an efficient pager protocol. Each pager has a specific, unique, identification and a group code. Thus, when control center 24 is to communicate with an entire group, potentially consisting of thousands of mobile locators, only one pager communication signal need be broadcast.

Figure 8:
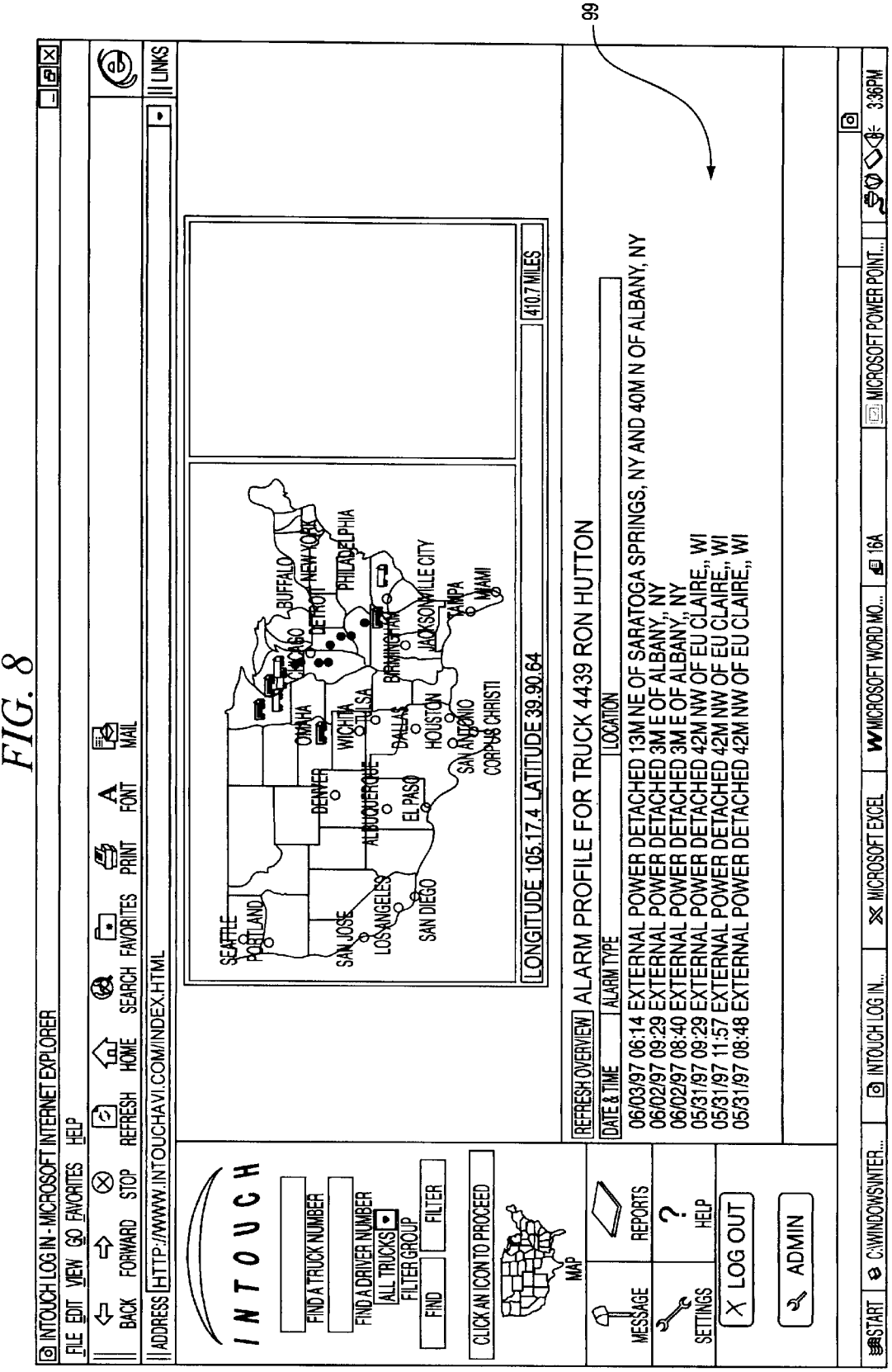

FIG. 7 allows the user to obtain additional information about the fleet as well. By clicking on the alarm configuration information in field 105 for a given truck, the particular alarm profile for any given locator device 32 can be viewed. This is illustrated by a user interface, such as that illustrated in FIG. 8. As shown, the particular truck number and driver are identified in field 99, along with all the dates and times that alarm conditions were conveyed to control center 24. Also, the type of alarm is expressly illustrated, and the location of the truck at the time that alarm was sent is also illustrated.

Figure 9:
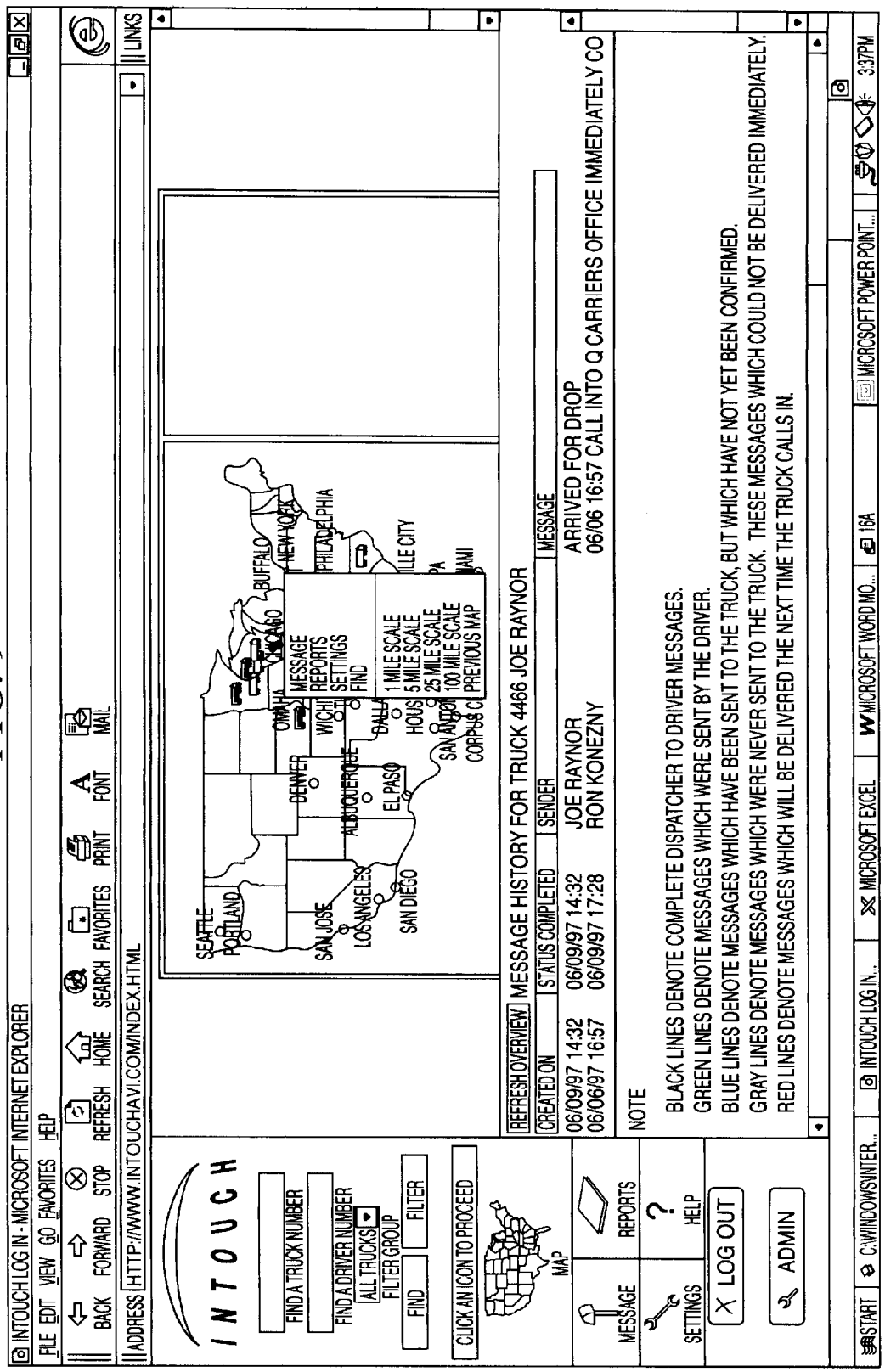

By clicking on the message information in field 107 (of FIG. 7) for a given truck, the dispatcher can view the message history for any given truck number or driver. This is illustrated by a user interface such as that shown in FIG. 9. It should be noted that, in the preferred embodiment, the messages as displayed on the screen are color coded to indicate whether the messages have been completed, just sent, sent but not confirmed, not yet sent (because they could not be completed), or are scheduled to be sent, but have not yet been sent. In one preferred embodiment, the message, the date and time of creation and completion, and the sender are all illustrated.

Figure 10:
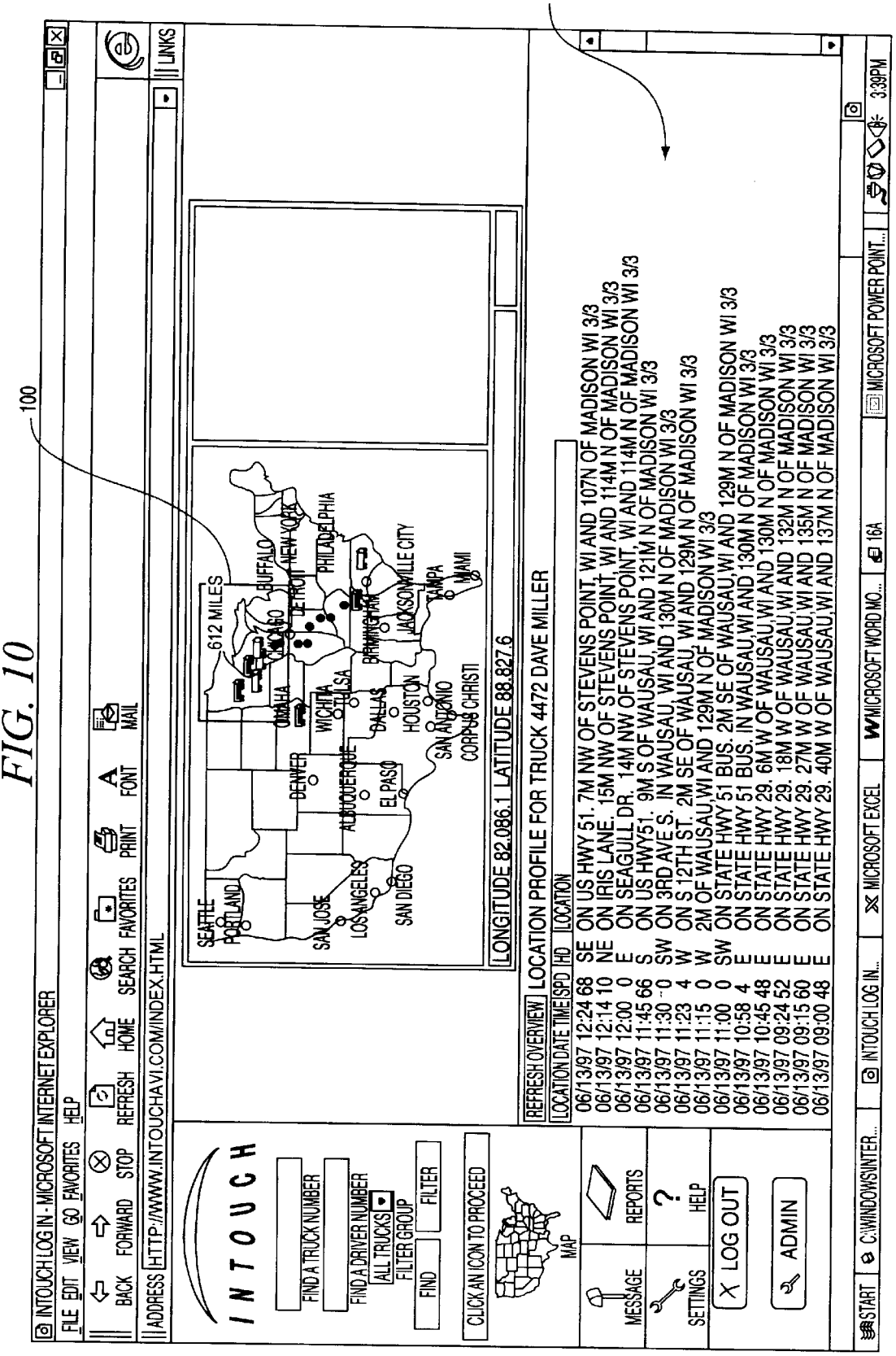

The operator can also obtain location profile information for locator devices illustrated in FIG. 7 by clicking on location information in field 109 for any given truck. FIG. 10 illustrates one preferred customer interface which is provided by server 52, and illustrates the location profile of any given locator device 32. As shown in FIG. 10, an enlarged map section 100 is provided which highlights the particular truck being viewed. The location profile is set out in data field 99 and includes the location and time that each particular location fix was taken, the speed of locator device 32 at that time, the heading of the locator device, and the specific location, given in terms of approximate address. With this information, the progress or movement of any particular locator device 32 can be quickly and efficiently tracked.

Figure 11:
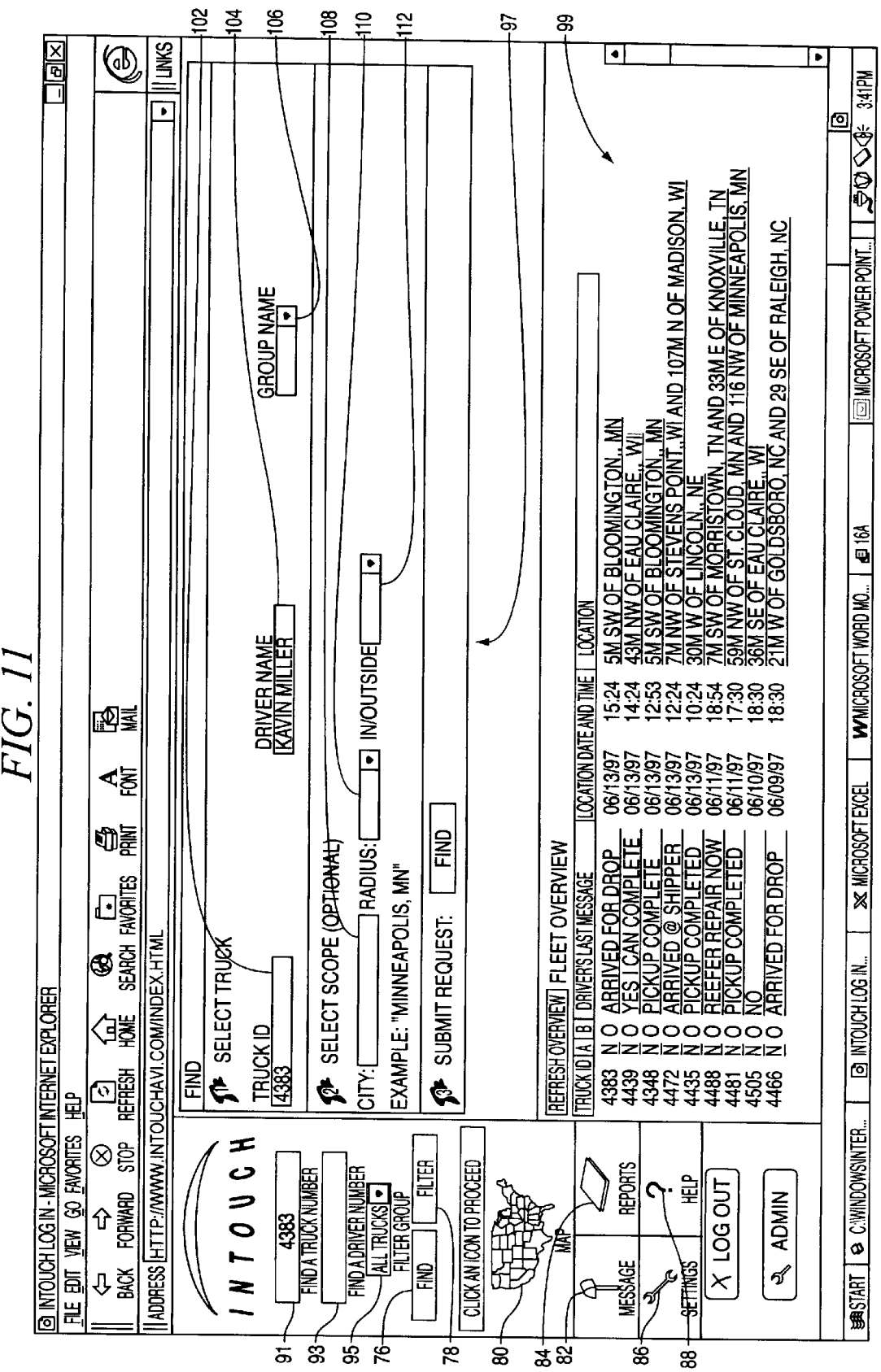

FIG. 11 illustrates one preferred embodiment of an operator interface which is provided to the dispatcher when a particular truck number is entered in truck number field 91. At that point, the upper portion 97 of the interface illustrates the truck ID in field 102, the driver name in field 104, and any groups to which the particular truck and driver belong, in field 106. The dispatcher is then given the option to select the scope of the search used to locate that particular truck. The search can be narrowed to a given city which is entered in field 108, and a radius about that city given in field 110, along with an indication as to whether the operator is inquiring whether the truck is inside or outside of that radius, indicated by field 112. Also, at the bottom of the operator interface, in data field 99, the fleet overview data information is preserved.

FIG. 11 also illustrates a number of icons which provide the user with certain functions, including map icon 80, message icon 82, reports icon 84, settings icon 86 and help icon 88.

Figure 12:
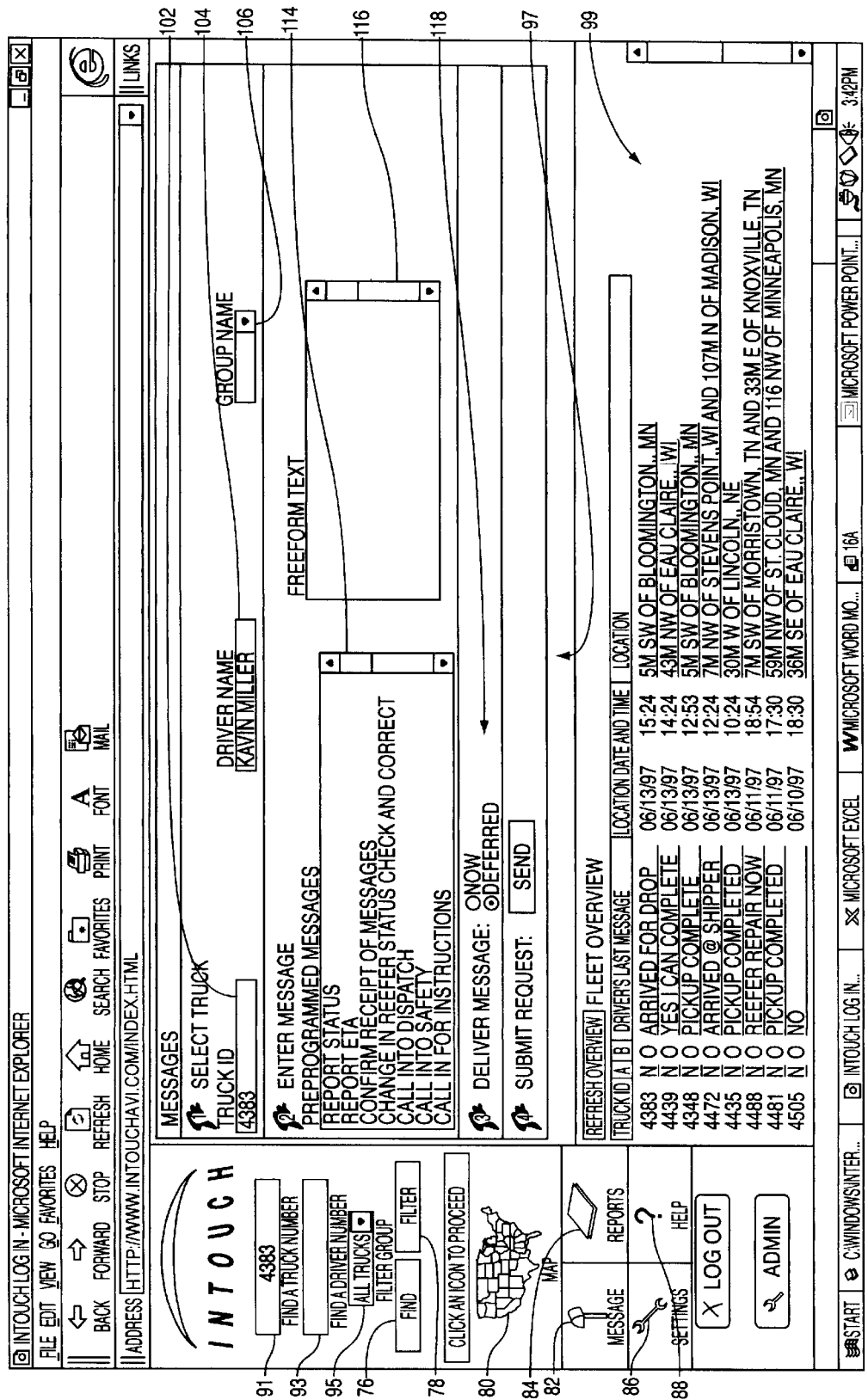

Once the particular truck identified in FIG. 11 is located, the dispatcher is provided with the option of sending a message. This is done by simply clicking on the message icon 82. In response, server 52 provides the dispatcher with another interface, such as that shown in FIG. 12, which includes an indication of the preprogrammed messages associated with that particular locator device 32. This information is illustrated in field 114 in the upper portion 97 of the interface. The dispatcher is also provided with a field 116 in which to enter a free form text message which is to be sent to that particular locator device 32. In addition, the dispatcher is provided with the option of prioritizing the message. In field 118, the dispatcher can indicate that the message is to be delivered now, or deferred and sent in the normal course of operation of control center 24.

Figure 13:
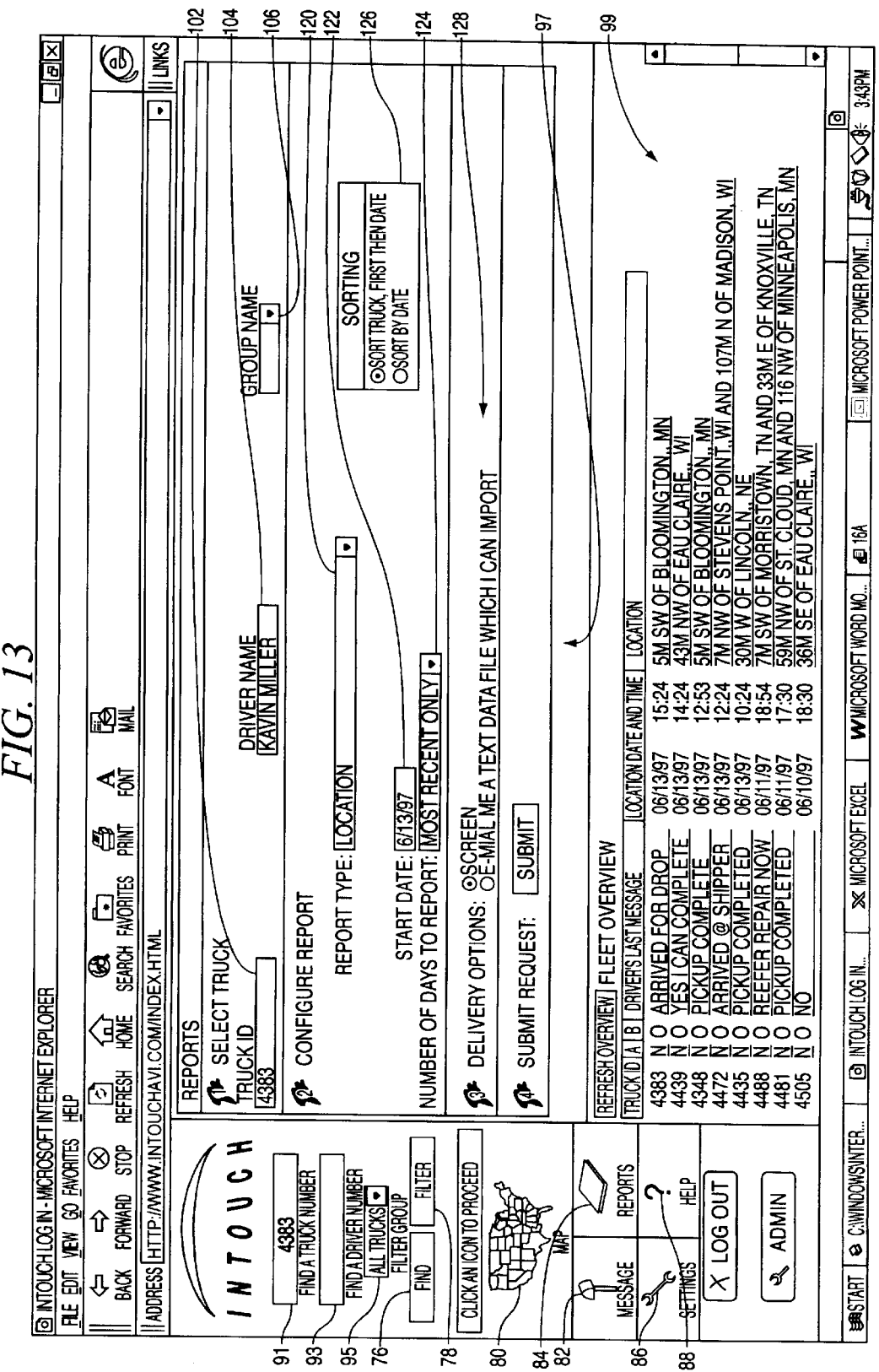

FIG. 13 illustrates an operator interface provided by server 52 to the dispatcher at station 28 when the dispatcher clicks on the reports icon 84. The truck ID number, driver name and group fields 102, 104 and 106, respectively, remain unchanged. However, the operator is provided with the ability to choose the type of report to be generated by entering that type, or scrolling to that type, in field 120. The operator is then provided with the ability to limit the chronological extent of the report by entering a start date in field 122, and by entering the number of days to report in field 124. The priority of sorting (either by truck or by date) can also be selected by the dispatcher in field 126. Further, the form of delivery of the report can also be selected by the dispatcher in field 128. In that field, the dispatcher can select whether the report is to either be delivered to the dispatcher's screen, or e-mailed as a text file which can be imported into a document currently being generated by the dispatcher.

Figure 14:
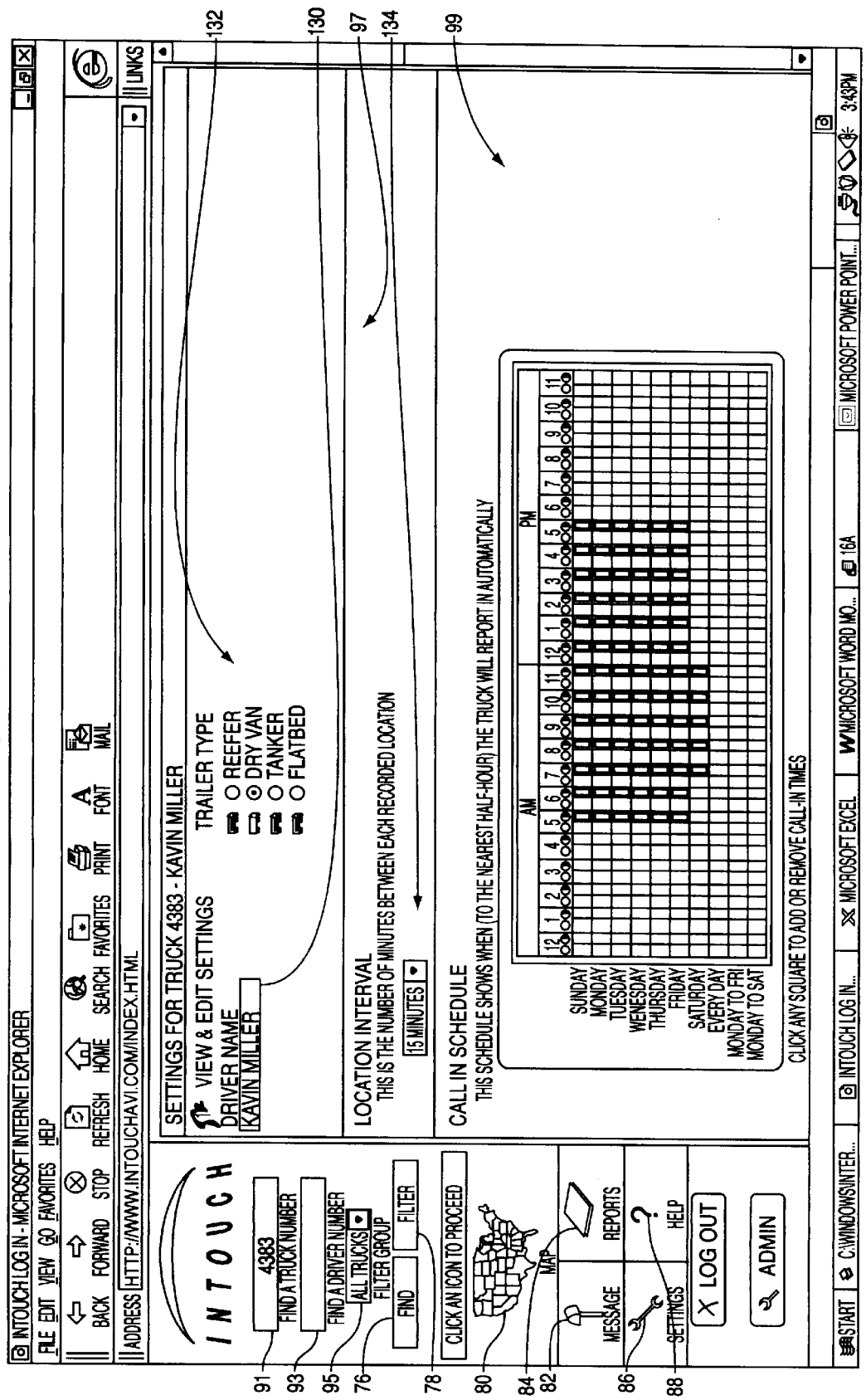

FIG. 14 illustrates an operator interface which is presented by server 52 to the dispatcher at station 28 when the dispatcher selects the settings icon 86. The upper portion 97 of the interface is configured to illustrate the driver name in field 130 and the trailer type in field 132. The location interval field 134 is configured to illustrate the time between position fixes which that particular location device 32 will take. In other words, controller 64 (shown in FIG. 2) will automatically receive, from GPS receiver 62, location information from satellite based global positioning system 12. Controller 64 stores that information so that the dispatcher can review a certain level of historical data which is indicative of the path of locator device 32 over a predetermined prior period of time. In FIG. 14, the interval between such position fixes is indicated at 15 minutes. This is selectable by the dispatcher.

FIG. 14 also illustrates that the lower data field 97 in the interface depicts the call-in schedule for that particular location device 32. In other words, controller 64 can be configured to use cellular transceiver 58 to automatically initiate communication with control center 24. During such communications, a typical transaction is for controller 64 to download position information, and thus update data base 46 in control center 24 with the most recent position information stored by controller 64. Controller 64 can be configured to automatically initiate such communication, on periodic intervals, or at any time during a day or week. The data field 97 shown in FIG. 14 illustrates a call-in schedule (to the nearest half hour) when the particular locator device 32 will automatically initiate such communication. Of course, this schedule can be altered by the dispatcher. In a preferred embodiment, the dispatcher simply places the cursor over any of the squares in the schedule and clicks on the square in order to activate or de-activate a call-in at that particular time.

Figure 15:
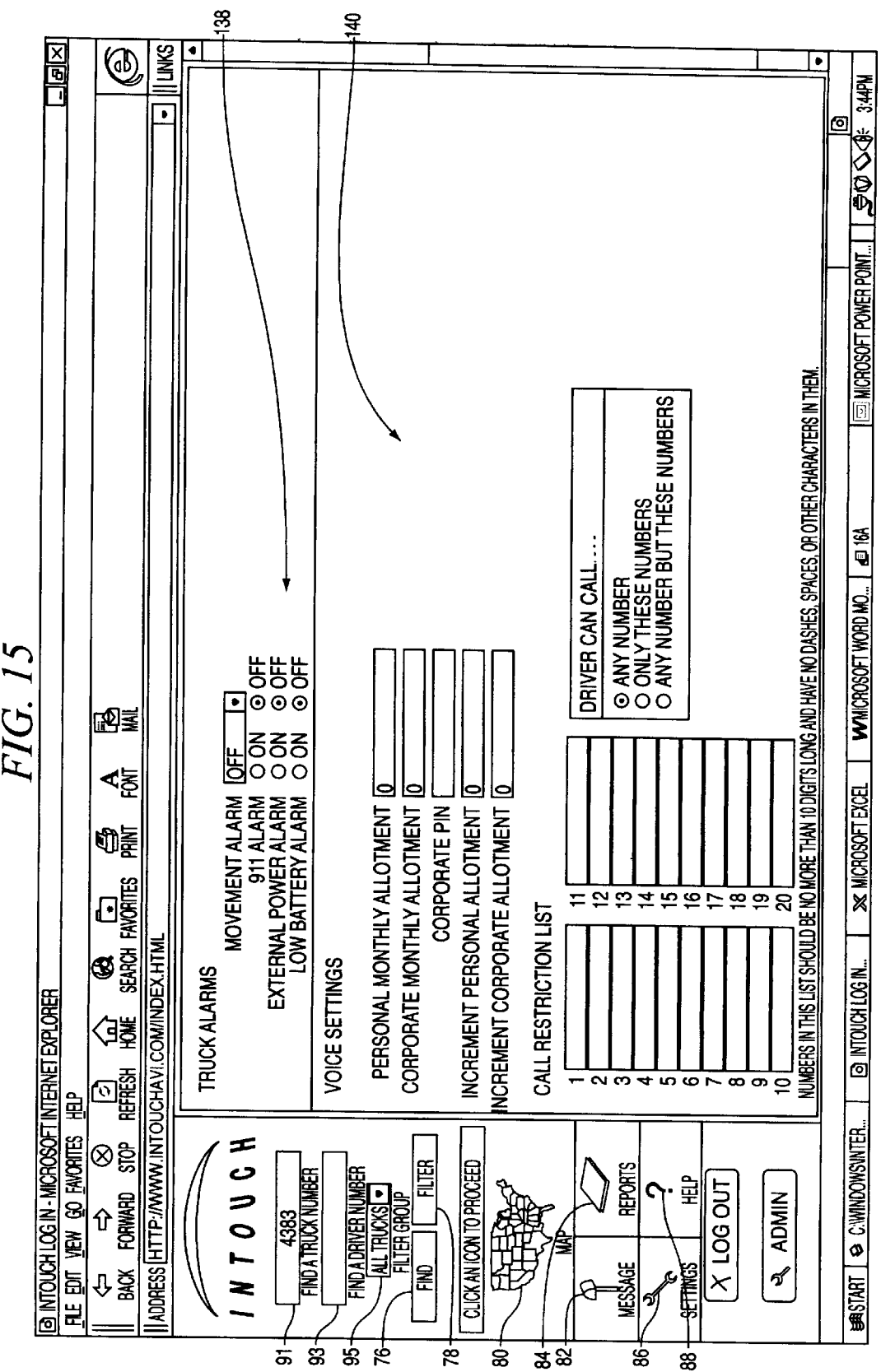

FIG. 15 illustrates the remainder of the settings first illustrated in FIG. 14. By using the arrows on the far right of the interface, and scrolling downward, the dispatcher can view the remainder of the settings for that particular locator device 32.

A variety of different alarms are illustrated in field 138. A more detailed list of alarms will be discussed later in the specification. The lower portion 140 of the interface illustrated by FIG. 15 indicates certain settings which can be incorporated into locator device 32 for the cellular communication capability of locator device 32. For example, voice settings illustrated in FIG. 15 allow the dispatcher to set a personal and corporate monthly allotment for cellular charges which can be incurred by any particular locator device 32. In addition, a corporate personal identification number (PIN) can be inserted which allows the operator of locator device 32 to charge cellular communications to the corporate account, only if the PIN is known, and input into the phone prior to such communications. The voice settings also allow the dispatcher to increase both the corporate and personal allotments allowed for any particular locator device 32.

Field 140 also illustrates a call restriction list. This list includes fields for receiving a list of telephone numbers. The dispatcher can then configure the locator device 32 such that it allows the operator to initiate cellular communication with any other number, with only the numbers on the call restriction list, or with any number but those on the call restriction list.

Figure 16:
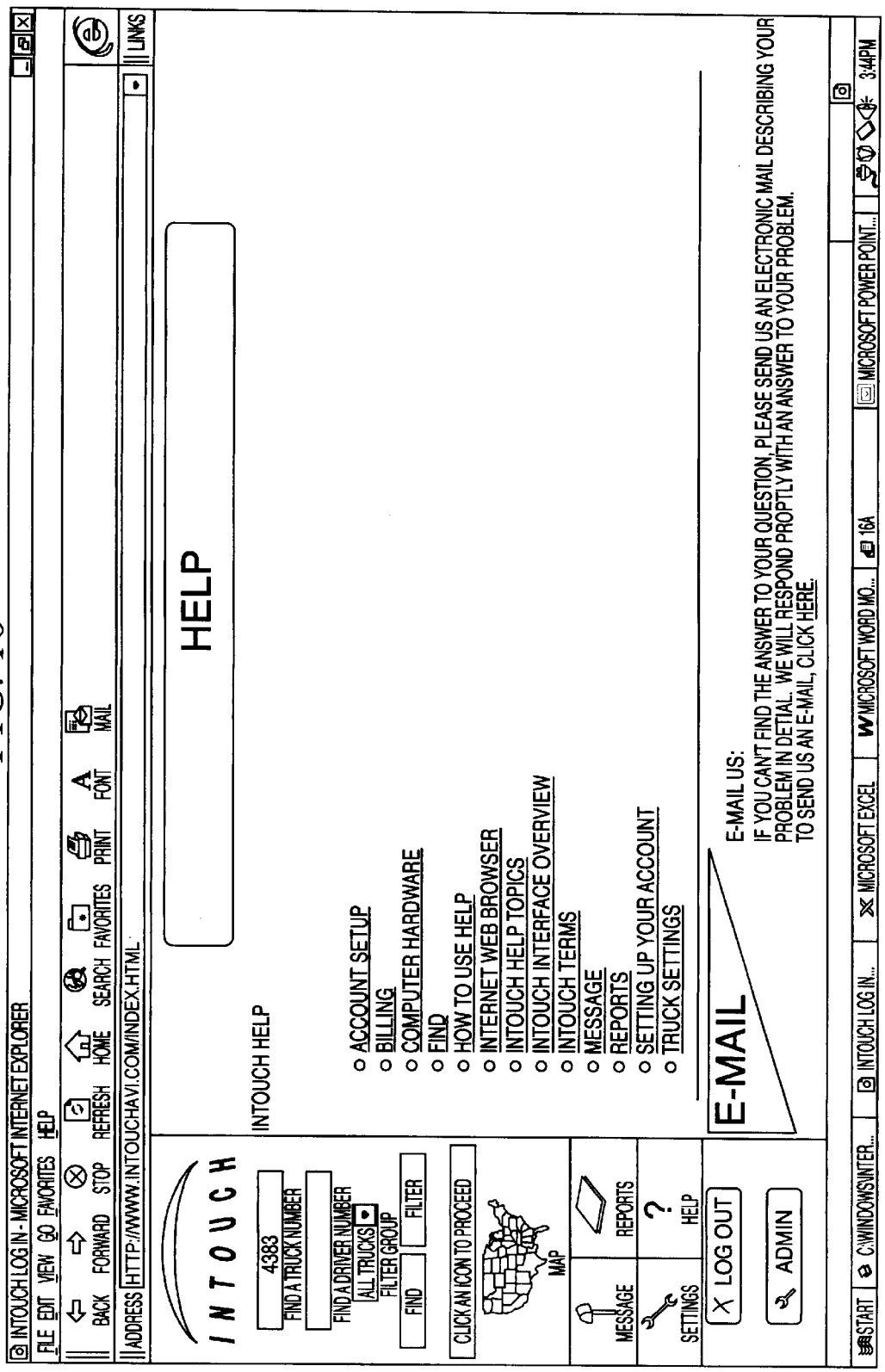

FIG. 16 illustrates an operator interface which is presented by server 52 to station 28 in response to the operator clicking on help icon 88. The interface illustrated in FIG. 16 allows the dispatcher to receive help. A number of exemplary help subjects are listed in FIG. 16. Of course, any number of other suitable help subjects can be provided as well.

Table 1 is a list of common communications between control center 24 and locator device 32. The call now command is issued by control center 24 to initiate an exchange of messages between control center 24 and locator device 32. Upon initiating that message, and upon receipt of that message by locator device 32, all messages, including everything that is waiting to be sent to the control center 24 from locator device 32, is exchanged. Locator device 32 also determines whether any mail is waiting to be sent to it, and that mail is received. The call now command can be configured such that locator device 32 calls in to control center 24 immediately upon receipt of the message, or first obtains a location (GPS) fix and then calls in to control center 24.

The request alarm report command is issued by control center 24. In response, locator device 32 provides a report on the status of all alarms currently attached to locator device 32. This information is placed in an output message queue by controller 64 of locator device 32, where it is delivered at the next time that the locator device is in contact with control center 24.

The send alarm command is received by locator device 32 and is used to populate an alarm code table at locator device 32. The alarm code table holds the alarm code which is returned to control center 24 when an alarm is activated.

The alarm switch on and alarm switch off commands are issued by control center 24 and cause locator device 32 to enable a particular alarm switch (upon receipt of the alarm switch on command) or disable the designated alarm (when the alarm switch off command is received). When the alarm switch on command is received, and that particular switch is already enabled, locator device 32 sends back an alarm message immediately, corresponding to that alarm switch.

One type of alarm is a tamper alarm. This alarm when enabled creates an alarm condition when tampering of some fashion is detected. This type of alarm has particular applicability to fleet management systems where it is desirable that a trailer not be tampered with through the majority of its travel or when unhooked from a tractor.

Also, the alarms themselves can be enabled and configured and used in conjunction with one another to provide higher level alarm type functions. For example, a mobile locator system which is embodied in a fleet management system may allow a trailer to be loaded without creating an alarm condition. However, once the trailer leaves a zone of loading, a tamper alarm is enabled which creates an alarm condition if the trailer is tampered with while en route. However, as the trailer approaches its destination, and travels within a zone of unloading, the tamper alarm may be automatically disengaged to allow simple and efficient unloading without tripping the tamper alarm.

The battery alarm on and battery alarm off commands enable locator device 32 to enable and disable the battery alarm. When the battery alarm is enabled, the locator device 32 monitors the level of battery power being supplied to it. If the battery output drops below a threshold level, then an alarm message is sent to control center 24 immediately. In the preferred embodiment, once a successful low battery alarm has been sent to control center 24, no other low battery alarms are sent until locator device 32 detects that it is again out of a low power situation.

The 911 alarm on and off commands enable and disable the 911 alarm on locator device 32. When this alarm is enabled, locator device 32 records when the driver or operator of locator device 32 makes a 911 call on handset 70. As soon as the driver hangs up handset 70, the locator device 32 sends a 911 alarm to the control center 24 to indicate that a 911 call was placed.

The movement alarm on and movement alarm off commands enable and disable the movement alarm. When the movement alarm is enabled, locator device 32 monitors its own movements to determine whether it has moved more than a specified distance, each time it takes a GPS fix. The distance can be modified by the dispatcher. Specifically, a movement alarm is configured to become active when mobile locator device 32 detects that mobile locator device 32 itself has moved a preselected distance while the movement alarm is engaged. Through communication between control center 24 and mobile locator device 32, the mobile locator system is capable of enabling or disabling such movement alarms and configuring the amount of permissible movement which is allowed before the movement alarm becomes active.

After the movement alarm is enabled, mobile locator device 32 acquires a first and second position from the GPS system. After acquiring the second position, the mobile locator device 32 determines the distance between the original location (as stored during the first position acquisition) and the second position acquired. After calculating the displacement from the original position, mobile locator device 32 determines whether the distance traveled is greater than the radius allowable. If mobile locator device 32 has traveled an unacceptable distance (i.e., displacement is greater than the radius allowable), an alarm condition is set. If, however, the displacement is less than the acceptable radius, then no alarm condition is set. If the movement alarm continues to be enabled then locator 32 acquires another position. This process continues.

Another alarm of general applicability to mobile locator system 10 is a proximity alarm. This type of alarm is essentially a complement of the movement alarm. Specifically, when the proximity alarm is enabled, it creates an alarm condition when mobile locator device 32 determines that mobile locator device 32 itself is within a preselected distance from a preselected position. Preferably, control center 24 causes mobile locator device 32 to enable the proximity alarm. After enabling the alarm, mobile locator device 32 is caused to acquire its position. Mobile locator device 32 then determines the distance between the acquired position, and a target position. Next, mobile locator device 32 compares the distance between the acquired position and the target position with a minimum allowable radius which was received by mobile locator device 32 during enablement. If mobile locator device 32 is unacceptably proximate the target coordinates, an alarm condition is set. If, however, mobile locator device 32 is not unacceptably proximate the target coordinates, then no alarm condition is set. Similar to the movement alarm the proximity alarm ends upon being disabled.

The set mode command allows locator device 32 to be set to one of a number of modes. When locator device 32 is ON, that indicates that the entire system is powered and is constantly running. When locator device 32 is in a SLEEP mode, that indicates that all of the components of locator device 32 are off, except the pager module 66, and any alarm switches associated with locator device 32. In the SLEEP mode, locator device 32 still services its call-in schedule, during which it initiates communication with control center 24 to provide position information and exchange other suitable information. In that embodiment, locator device 32 wakes itself up periodically to initiate such communication. Also, in the SLEEP mode, if control center 24 wishes to initiate communication with locator device 32, control center 24 pages locator device 32. Page module 66 then initiates a power-up sequence to power-up the remainder of locator device 32 so that full communication can be accomplished between locator device 32 and control center 24.

In the DEEP SLEEP mode, locator device 32 is completely powered down, except that pager module 66 is cycled on and off in accordance with a predetermined power budget which the operator wishes to meet. In other words, of power has been removed from locator device 32 (such as the semi trailer ignition being turned off, or when locator device 32 is untethered in a semi trailer), the operator may wish to meet a very low power budget. Thus, everything on locator device 32 is turned off, except that pager module 66 is periodically cycled on and off to save power. In the DEEP SLEEP mode, locator device 32 still recognizes any alarm conditions based on 0–N sensor alarm inputs.

In the OFF mode, locator device 32 is turned off completely.

Locator device 32 is preferably controlled among the various modes according to the parameters set out in Table 3. A mode number (1–5) is given on the left hand side of Table 3. The four parameters (external power, internal battery, time and action) are given along the top of Table 3. The external power parameter indicates that locator device 32 is receiving power from an external source (such as the semi tractor battery). The internal battery parameter indicates that locator device 32 is only receiving power from an internal battery, or that the ignition to the semi tractor is turned off so that no alternator power is being provided. The time parameter indicates a number of hours (or other suitable time interval) during which locator device 32 will stay in the ON state even after external power (such as the ignition) is turned off, and before it enters the SLEEP mode. The action, if yes, indicates that locator device should call control center 24 prior to going into the SLEEP mode, so that control center 24 knows that locator device 32 is sleeping. If no, the action indicates that locator device 32 need not call in before going to sleep.

Therefore, as indicated by Table 3, when external power is applied, locator device 32 can be configured to be ON, OFF, or in SLEEP mode. When only internal power is applied, locator device 32 can be configured to be in SLEEP mode, in DEEP SLEEP mode, ON or OFF. The number of hours for the transition in mode (from the mode associated with external power applied to the mode associated with internal power only) can be programmed, and the action (whether locator device 32 will be required to call in prior to going to sleep) can also be configured in accordance with modes 1–5.

The GPS interval command indicates how often locator device 32 is to store a position fix.

The call if LD inside/outside a circle command allows the dispatcher to configure the locator device to see whether locator device 32 is inside a circle defined by the latitude, longitude and radius parameters provided to locator device 32, or whether it is outside such a circle.

The change voice handset call allotment command allows the dispatcher to set two allotments for each locator device 32. These allotments can be reset automatically after a particular time has passed. The increment voice handset call allotment allows the dispatcher to either subtract or add minutes to a current call allotment by programming in a negative, or positive, increment number into the locator device 32. The external power attached alarm on/off commands enable and disable an alarm which indicates when power is detached from locator device 32. If the alarm is enabled, locator device 32 sends an alarm immediately to let control center 24 know that it has been unhooked from its power source.

The change NAM command allows a dispatcher to change the phone number of the particular transceiver 58 in locator device 32.

The change calling sequence command allows the dispatcher to configure locator device 32 to make a predetermined number of calls, and to change the timing when locator device 32 automatically calls control center 24. In other words, if a first call to control center 24 is unsuccessful, the dispatcher can configure the number of calls which locator device 32 is to attempt to make, and the timing between those calls, in an effort to initiate communication with control center 24.

The SID specific system selection command allows a SID specific selection list to be set. Whenever locator device 32 is making a call within one of the SID systems on the list, locator device 32 switches from its normal A-side operation to B-side operation for that particular call.

The set SLEEP cycles command allows the dispatcher to set the schedules for the GPS receiver 62, and cellular transceiver 58 in locator device 32 when locator device 32 is in a SLEEP mode. Thus, the schedules for receiving position fixes and communicating those position fixes to control center 24 can be configured.

The NVRAM purge command allows the dispatcher to have locator device 32 purge all NVRAM. This command erases all information that is kept by locator device 32, including all scripts, any scheduled events, and all saved location fixes, etc. This command is typically issued in order to completely reprogram locator device 32.

The set pager groups command allows the administrator to configure locator device 32 to be in one of a number of pager groups. The group list is held in memory by locator device 32. When a page is received, locator device 32 examines the pager group list contained therein, to see whether it should respond to the page. The set pager groups command allows the administrator to change the group list stored by locator device 32.

The display preprogrammed message command can be appended to another communication. This causes locator device 32 to look up a corresponding preprogrammed message in memory, and display that message on message display 68 for observation by the operator. The display free form message command causes locator device 32 to pass the text message received to message display 68 for observation by the operator.

The change voice call numbers command allows the administrator to change the numbers illustrated in the call restriction list set out in FIG. 15.

The change system selection options command causes locator device 32 to select a system (A or B) to be used based on the setting passed by this command. In the normal operating mode, locator device 32 uses the A side for all communications, but switches to the B side for out of bounds calls when the current A side SID is listed in the SID specific selection table.

The set preprogrammed messages command allows the administrator to set new preprogrammed messages, such as those set out in FIG. 6.

The send new script command sends new features to locator device 32 which can be implemented on a device.

The erase all scripts command causes locator device 32 to erase all scripts then in memory.

The request AMPS configuration causes locator device 32 to return to control center 24 a list of the AMP configuration then held by locator device 32 (i.e., the ESN, NAM1, NAM2 and current system selection mode).

The request SID list command causes locator device 32 to return the SID list then contained in its memory. The request pager group BIT MASK command causes locator device 32 to return the current pager groups listed in its memory. The request preprogrammed message list command causes locator device 32 to return all of the pre-programmed messages contained in its memory, and the request call restriction causes locator device 32 to return the call restriction list and the current restriction modes then contained in its memory.

The communications test response command is primarily used for installation. This causes locator device 32 to step through a predetermined call sequence and respond to control center 24, so that the installer is notified that the installation has been successful.

The request script dump command causes locator device 32 to send back to control center 24 all of the current scripts then running in memory.

The set pager cycle command and the set cellular SLEEP power cycles command configure the pager and cellular transceiver for SLEEP and DEEP SLEEP modes.

The change AMPS PIN behavior mode allows the administrator to change or disable the lock and unlock sequence used by locator device 32 in making cellular communications.

The request schedule strings command causes locator device 32 to return to control center 24 a list of all schedules which locator device 32 is then configured to meet.

The request and clear NVRAM commands causes locator device 32 to either provide control center 24 with a listing of its NVRAM contents, or causes locator device 32 to clear its NVRAM contents, respectively.

The set 111 phone number command is a feature which allows a customer or user of locator device 32 to quickly initiate communication with control center 24, by dialing a predetermined number string (such as 111). This command translates that number into a phone number which is associated with control center 24.

The set diagnostic number bank allows the administrator to configure locator device 32 to send back a given set of diagnostic information with each cellular phone call.

Table 2 illustrates the preferred messages which travel from locator device 32 to control center 24. The message confirmation operation sends back a message confirmation to the control center 24 for every message that is received by locator device 32. A serial number associated with the incoming message is duplicated in a message header of the message confirmation, and a status field is set to show whether the command was recognized and processed accordingly.

The location bread crumb (bread crumb being position information, including date and time of location fixes) message holds the location information associated with the locator device 32. It also contains all of the bread crumb information stored in memory.

The driver pre-programmed message is generated to carry a pre-programmed message from location device 32 to control center 24. This message is also used when a driver (or user of locator device 32) replies to a message which is sent to him from control center 24.

The alarm message and alarm status are sent to control center 24 to indicate that an alarm condition exists, or to indicate the status of any particular alarm being carried.

The call record message is generated whenever a cellular phone call is initiated, or answered, at locator device 32. This message is generated for all voice and data calls. The message includes the date and time the call is initiated, the duration of the call, the cellular system in which the call was made or received, and the location of the locator device 32 when the call was made or received.

All of the messages which start with the term return in Table 2 simply indicate information which is returned in response to a request from control center 24, as described with respect to Table 1.

The perform communications test message is a request from locator device 32 for the control center 24 to complete a communications test. In response, control center 24 pages locator device 32. When locator device 32 receives the responsive page, it displays a confirmation on message display 68. Before the perform communications test message is sent, an installer is preferably required to input a truck identification number into which he is installing locator device 32.

The notification of state change message is generated by locator device 32 and notifies the control center 24 when locator device 32 changes from an awake to SLEEP or SLEEP to awake mode. This is preferably only generated when a parameter is set in locator device 32 requesting that it be generated. Control center 24 preferably utilizes this information in determining whether device 32 is likely to be asleep or awake when control center 24 is attempting to call it.

In one preferred embodiment, the pager messages can be any suitable messages from control center 24 to locator device 32. However, a number of those messages are particularly suitable for pager messages. For example, the call now message identified with respect to Table 1, the display pre-programmed message command, the activation of certain alarms, the setting of modes in locator device 32, the communications test response message identified with respect to Table 1, and the communications test response indicated in Table 2. Other information is also particularly well suited to pager communication. For example, where control center 24 desires to know whether locator device 32 is inside or outside a certain circle, such a message is well suited to pager communication. In addition, group communications are also particularly well suited to pager communication. This is because the pager communication is a very low cost means of broadcasting a message to any number of locator devices 32. Where, for example, control center 24 desires to know how many trucks are within or without a certain radius, control center 24 simply broadcasts the message to an entire group, and waits for responses from that group.

Pager communication significantly reduces the amount of communication overhead needed to support the mobile locator system 10 of the present invention. Although it may seem counter intuitive that adding means of communication (i.e. a pager) would actually simplify communication and reduce the communication burden, it should be borne in mind that pager communication is currently very efficient and inexpensive as compared to cellular communication. The mobile locator system of the present invention takes advantage of pager communication in various ways.

First, pager communication can be used to prompt mobile locator device 32 to respond with certain types of information such as alarm status, or location. In this respect, much of the communication emanating from control center 24 to mobile locator device 32 is in the form of highly efficient and inexpensive pager communication. Another example of the use of pager communication by the mobile locator system 10 of the present invention, is when control center 24 addresses a specific mobile locator device 32, or a specific group of mobile locators (not shown), to alter or change a configuration parameter. Such configuration parameters can include the movement alarm, the proximity alarm, a trailer tampering alarm, communication configuration parameters, or other appropriate parameters.

Another example of the use of pager communication by mobile locator system 10 of the present invention, is when control center 24 causes a specific mobile locator device 12 or a specific group of mobile locators 12 to enter a powered-down state similar to a (e.g., the SLEEP mode). Typically, a cellular transceiver operating on its own internal battery power can rarely operate in a standby mode for much more than 24 hours. In contrast, pagers typically operate for months in a standby mode. Thus, in some circumstances, control center 24 may issue a SLEEP command to mobile locator device 32 which causes all components of mobile locator device 32 to shut off, except for the pager component (device 32 may also enter the SLEEP mode on its own after a given time period). The pager module 66 continues to monitor communications emanating from control center 24 to determine if an awaken signal is detected. If such an awaken signal is detected by the pager component in mobile locator device 32, mobile locator device 32 essentially turns back on, thus waking up. This feature is highly advantageous because pagers require much less energy while receiving or monitoring communications as compared to cellular transceivers. In this manner, significant power conservation can be achieved which is of the utmost importance in self-powered circumstances.

Some semi trailers are not provided with power from the tractor unit. Thus, when a mobile locator of the present invention is used with such trailers, it must rely on self-contained battery power. As such, the mobile locator device 32 must conserve power whenever possible. Thus, the power saving feature described above becomes highly advantageous.

One preferred embodiment will now be described further with respect to additional potential commercial application. As described above, the present invention has particular applicability to vehicle fleet management. Similarly, the present invention can be used for tracking and auditing truck advertising. Often, truck owners, specifically owners of large trucks such as over-the-road transports, will allow advertising indicia to be placed on their trucks in exchange for an advertising fee. However, determining an appropriate fee can be difficult because various trucking routes have vastly different advertising potential. For example, a truck route which passes through largely unpopulated areas may have little, if any, advertising value at all. In contrast, truck routes passing through heavily populated, urban areas, may have very significant advertising potential. Thus, the present invention may be used to track the routes of various trailers which are equipped with mobile locators of the present invention, to determine the location of various mobile locators at various times. This historical path data is, in turn, cross-referenced with Department of Transportation data to provide a measure of advertising effectiveness which corresponds with a probable number of people who would see the advertising indicia on a given truck.

As can be appreciated, the mobile locator system 10 of the present invention has many potential uses. The broad applicability of the present invention is based primarily upon the high degree of configurability and versatility which is provided. For example, as mentioned above, many types of alarms can be configured and/or enabled via communication between mobile locator device 32 and control center 24. The combination of cellular and pager communication provides great flexibility and efficiency. In addition, further configuration can be effected by configuring various types of subgroups within the main group of mobile locators. Also, the ability of users to completely configure all preprogrammed messages adds significant configurability to the entire system. Thus, the mobile locator system 10 is provided which can be configured to precisely match the needs of various applications ranging from fleet management systems to locating missing persons.

Although the present invention has been described with reference to preferred embodiments, workers skilled in the art will recognize that changes may be made in form and detail without departing from the spirit and scope of the invention.

What is claimed is:

1. A locator system, comprising:
   a locator device including a locator unit for obtaining geographical location information identifying a location of the locator device;
   a control center coupled to the locator device for bi-directional communication with the locator device;
   a remote workstation coupled through a global computer network to the control center, the control center providing a computerized user interface to the workstation through the computer network; and
   wherein the computerized user interface facilitates bi-directional communication between the locator device and the workstation;
   a data base containing at least location history information associated with the locator device; and
   a controller configured to combine the location history information with external database information to provide an indication of a number of people being in a vicinity of the locator device during a time period corresponding to the location history information.

2. The locator system of claim 1 wherein the computerized user interface comprises:
   a display for depicting a location of the locator device on a computer-generated map.

3. The locator system of claim 1 wherein the locator device comprises:
   a memory for storing a first pre-programmed message; and
   an operator input device receiving an operator input and initiating transmission of the first pre-programmed message to the control center in response to the operator input.

4. The locator system of claim 3 wherein the controller is adapted to receive the preprogrammed message and generate an electronic notification to a pre-selected workstation based upon a priority associated with the pre-programmed message.

5. The locator system of claim 4 wherein the electronic notification comprises electronic mail and wherein the controller transmits the electronic mail to the pre-selected workstation through the global computer network.

6. The locator system of claim 1 wherein the controller receives a communication from the workstation and is configured to selectively transmit the communication to the locator device.

7. The locator system of claim 6 wherein the controller is configured to transmit the communication to the locator device based upon a priority associated with the communication.

8. The locator system of claim 2 wherein the computerized user interface further comprises an overview field comprising:
   an identification field displaying an identification of an entity carrying the locator device;
   a status field displaying a status of the entity carrying the locator device;
   a last message field displaying a most recent message received by the control center from the locator device;
   a location field displaying a textual description of a location of the locator device; and
   a date-time field displaying a date and a time when a specific message was received by the control center from the locator device.

9. The locator system of claim 1 wherein the locator device includes:
   an alarm for sensing a predetermined parameter and providing a signal, when enabled, indicative of the parameter; and
   a controller configured to enable the alarm in response to a communication from the control center.

10. The locator system of claim 9 wherein the alarm comprises a movement alarm which automatically causes the locator device to transmit a communication signal to the control center if the locator device is moved a preselected distance.

11. The locator system of claim 1 and further including:
a cellular transceiver associated with the control center;
a cellular transceiver associated with the locator device; and
a pager associated with the locator device configured to receive pager information from the control center wherein the locator device transmits a cellular signal in response to receiving the first signal.

12. The locator system of claim 1 wherein the locator device is configured to periodically establish communication with the control center.

13. A locator system, comprising:
a locator device including a locator unit for obtaining geographical location information identifying a location of the locator device;
a control center coupled to the locator device for bi-directional communication with the locator device;
a remote workstation coupled through a global computer network to the control center, the control center providing a computerized user interface to the workstation through the computer network; and
wherein the computerized user interface facilitates bi-directional communication between the locator device and the workstation; and
a controller configured to receive a distance signal from the control center and to automatically transmit a communication signal to the control center if the locator device is within a distance, indicated by the distance signal, from a location, indicated by the distance signal.

14. The locator system of claim 13 wherein the computerized user interface comprises:
a display for depicting a location of the locator device on a computer-generated map.

15. The locator system of claim 13 wherein the locator device comprises:
a memory for storing a first pre-programmed message; and
an operator input device receiving an operator input and initiating transmission of the first pre-programmed message to the control center in response to the operator input.

16. The locator system of claim 15 wherein is adapted to receive the preprogrammed message and generate an electronic notification to a pre-selected workstation based upon a priority associated with the pre-programmed message.

17. The locator system of claim 16 wherein the electronic notification comprises electronic mail and wherein the controller transmits the electronic mail to the pre-selected workstation through the global computer network.

18. The locator system of claim 13 wherein the controller receives a communication from the workstation and is configured to selectively transmit the communication to the locator device.

19. The locator system of claim 18 wherein the controller is configured to transmit the communication to the locator device based upon a priority associated with the communication.

20. The locator system of claim 14 wherein the computerized user interface further comprises an overview field comprising:
an identification field displaying an identification of an entity carrying the locator device;
a status field displaying a status of the entity carrying the locator device;
a last message field displaying an most recent message received by the control center from the locator device;
a location field displaying a textual description of a location of the locator device; and
a date-time field displaying a date and a time when a specific message was received by the control center from the locator device.

21. The locator system of claim 13 wherein the locator device includes:
an alarm for sensing a predetermined parameter and providing a signal, when enabled, indicative of the parameter; and
a controller configured to enable the alarm in response to a communication from the control center.

22. The locator system of claim 21 wherein the alarm comprises a movement alarm which automatically causes the locator device to transmit a communication signal to the control center if the locator device is moved a preselected distance.

23. The locator system of claim 13 and further including:
a cellular transceiver associated with the control center;
a cellular transceiver associated with the locator device; and
a pager associated with the locator device configured to receive pager information from the control center wherein the locator device transmits a cellular signal in response to receiving the first signal.

24. The locator system of claim 13 wherein the locator device is configured to periodically establish communication with the control center.

* * * * *